US010730503B2

(12) United States Patent
Okada et al.

(10) Patent No.: US 10,730,503 B2
(45) Date of Patent: Aug. 4, 2020

(54) DRIVE CONTROL SYSTEM

(71) Applicant: Hitachi Automotive Systems, Ltd., Hitachinaka-shi, Ibaraki (JP)

(72) Inventors: Takashi Okada, Tokyo (JP); Taisetsu Tanimichi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 133 days.

(21) Appl. No.: 15/520,443

(22) PCT Filed: Oct. 7, 2015

(86) PCT No.: PCT/JP2015/078429
§ 371 (c)(1),
(2) Date: Apr. 20, 2017

(87) PCT Pub. No.: WO2016/080100
PCT Pub. Date: May 26, 2016

(65) Prior Publication Data
US 2017/0313297 A1 Nov. 2, 2017

(30) Foreign Application Priority Data
Nov. 18, 2014 (JP) ................................ 2014-233219

(51) Int. Cl.
*B60W 10/20* (2006.01)
*B60W 10/18* (2012.01)
(Continued)

(52) U.S. Cl.
CPC ............ *B60W 10/20* (2013.01); *B60W 10/18* (2013.01); *B60W 40/04* (2013.01); *G08G 1/09* (2013.01);
(Continued)

(58) Field of Classification Search
CPC .......... G08G 1/09; G08G 1/16; B60W 10/18; B60W 40/04; B60W 10/20; B60W 2550/14; B60W 2550/10
See application file for complete search history.

(56) References Cited

U.S. PATENT DOCUMENTS 8,855,849 B1 * 10/2014 Ferguson ................. G05D 1/00
701/28
8,880,273 B1 11/2014 Chatham
(Continued)

FOREIGN PATENT DOCUMENTS

CN 1696606 A 11/2005
CN 104050620 A 9/2014
(Continued)

OTHER PUBLICATIONS

Extended European Search Report issued in counterpart European Application No. 15860510.5 dated Jun. 21, 2018 (eight (8) pages).
(Continued)

*Primary Examiner* — Hussein Elchanti
(74) *Attorney, Agent, or Firm* — Crowell & Moring LLP

(57) ABSTRACT

This invention provides a secure self-driving system or drive-assisting system. A drive control system of the present invention has an image recognition unit for detecting the peripheral environment of a vehicle and a drive control apparatus that controls driving of the vehicle, characterized by having a peripheral environment storage unit for storing the peripheral environment of the vehicle and by changing a mode of drive control performed by the drive control apparatus on the basis of a detection performance status of the image recognition unit obtained on the basis of information about the peripheral environment stored in the peripheral environment storage unit and information detected by the image recognition unit.

13 Claims, 22 Drawing Sheets

(51) Int. Cl.
*B60W 40/04* (2006.01)
*G08G 1/09* (2006.01)
*G08G 1/16* (2006.01)

(52) U.S. Cl.
CPC ............ *G08G 1/16* (2013.01); *B60W 2552/00* (2020.02); *B60W 2554/00* (2020.02)

(56) References Cited

U.S. PATENT DOCUMENTS

| | | | |
|---|---|---|---|
| 9,863,928 B1* | 1/2018 | Peterson | G08G 1/0141 |
| 2010/0222954 A1* | 9/2010 | Ichinose | G05D 1/024 |
| | | | 701/26 |
| 2011/0166746 A1* | 7/2011 | Breuer | B60T 7/22 |
| | | | 701/29.2 |
| 2013/0197736 A1* | 8/2013 | Zhu | G05D 1/0088 |
| | | | 701/26 |
| 2014/0270548 A1 | 9/2014 | Kamiya | |
| 2015/0106010 A1* | 4/2015 | Martin | G01C 21/34 |
| | | | 701/410 |
| 2015/0161523 A1* | 6/2015 | Antonov | G06F 16/285 |
| | | | 706/12 |

FOREIGN PATENT DOCUMENTS

| | | |
|---|---|---|
| CN | 104573669 A | 4/2015 |
| EP | 1 396 833 A1 | 3/2004 |
| EP | 2 330 009 A1 | 6/2011 |
| EP | 2 750 118 A1 | 7/2014 |
| JP | 11-211492 A | 8/1999 |
| JP | 2013-160735 A | 8/2013 |

OTHER PUBLICATIONS

O. Furukawa, "ITS ni Kansuru Jidosha no Seigyo Gijutsu no Genjo to Kongo no Kadai," Journal of the Society of Instrument and Control Engineers, Mar. 10, 2001, pp. 207-213, vol. 40, No. 3. (nine (9) pages).

International Search Report (PCT/ISA/210) issued in PCT Application No. PCT/JP2015/078429 dated Jan. 19, 2016 with English-language translation (three (3) pages).

Japanese-language Written Opinion (PCT/ISA/237) issued in PCT Application No. PCT/JP2015/078429 dated Jan. 19, 2016 (four (4) pages).

Chinese-language Office Action issued in counterpart Chinese Application No. 201580052480.9 dated Jul. 2, 2019 with English translation (13 pages).

* cited by examiner

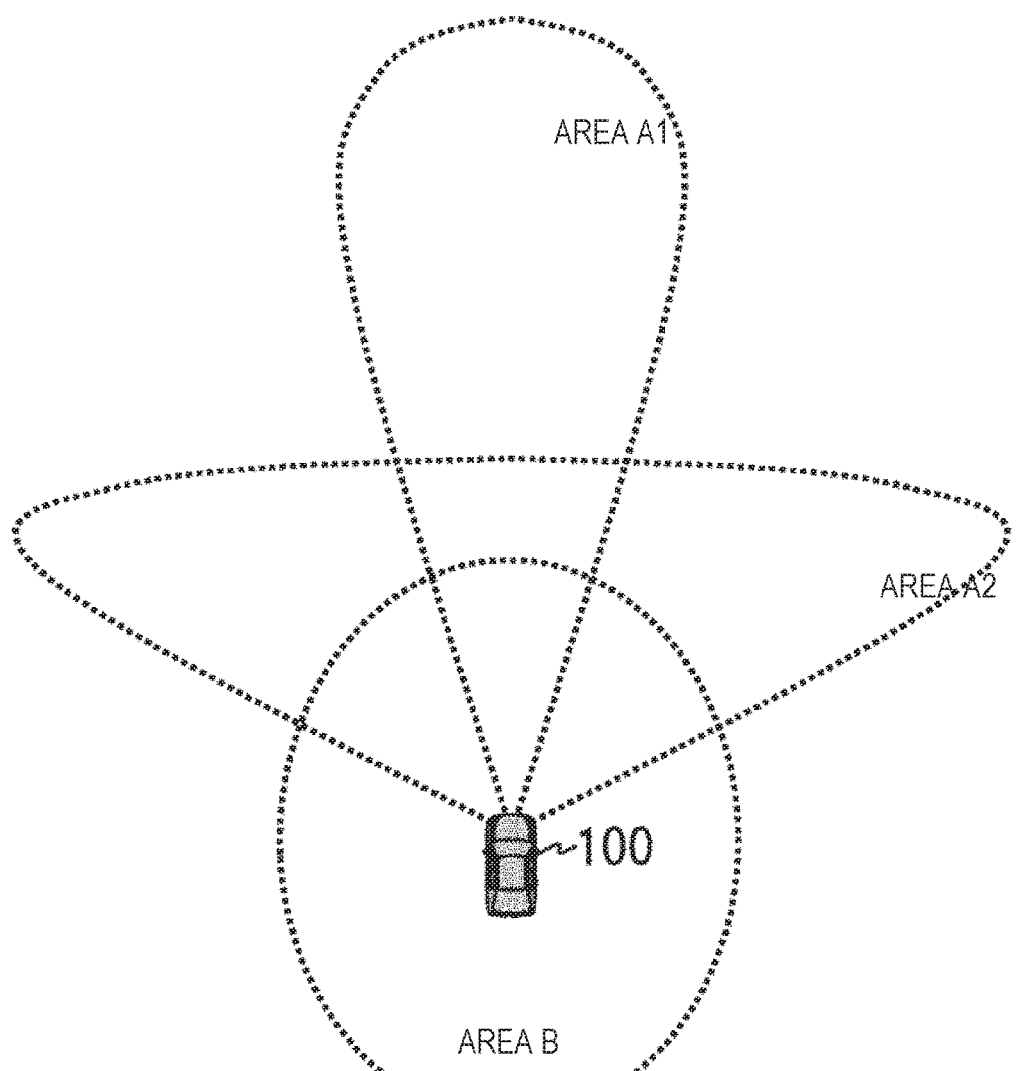

FIG. 13

| | TYPE | COORDINATES (POSITION) | SIZE |
|---|---|---|---|
| ROAD SURFACE INFORMATION | LANE MARKER | x=[x0,x1,···,xn]<br>y=[y0,y1,···,yn] | - |
| | STOP LINE | x=[xs0,xs1,···,xsm]<br>y=[ys0,ys1,···,ysm] | - |
| | ROAD SURFACE PAINT 1 | x=[xp10,xp11,···,xp1m]<br>y=[yp10,yp11,···,yp1m] | - |
| | ROAD SURFACE PAINT K | x=[xpk0,xpk1,···,xpkm]<br>y=[ypk0,ypk1,···,ypkm] | - |
| | ⋮ | ⋮ | ⋮ |
| | ROAD SURFACE PAINT L | CENTER POSITION (x,y)=(xpl,ypl) | Kk[m] |

| | TYPE | COORDINATES (POSITION) | SIZE |
|---|---|---|---|
| SOLID OBJECT INFORMATION | SIGN A | CENTER POSITION (x,y)=(xMA,yMA) | HEIGHT : ha[m]<br>WIDTH : wa[m] |
| | SIGN B | CENTER POSITION (x,y)=(xMB,yMB) | HEIGHT : hb[m]<br>WIDTH : wb[m] |
| | ADVERTISING DISPLAY A | CENTER POSITION (x,y)=(xKA,yKA) | HEIGHT : hka[m]<br>WIDTH : wka[m] |
| | TRAFFIC LIGHT A | CENTER POSITION (x,y)=(xSA,ySA) | HEIGHT : hsa[m]<br>WIDTH : wsa[m] |
| | ⋮ | ⋮ | ⋮ |
| | TRAFFIC LIGHT M | CENTER POSITION (x,y)=(xSM,ySM) | HEIGHT : hsm[m]<br>WIDTH : wsm[m] |

FIG. 17

| ROAD SURFACE INFORMATION | INFORMATION OF PERIPHERAL ENVIRONMENT STORAGE UNIT | INFORMATION OF IMAGE RECOGNITION DEVICE | SIMILARITY DETERMINATION |
|---|---|---|---|
| ... | ... | ... | ... |
| ... | PRESENT | PRESENT | 1 |
| RIGHT LANE MARKER X[m] AWAY | PRESENT | PRESENT | 1 |
| LEFT LANE MARKER X[m] AWAY | PRESENT | PRESENT | 1 |
| RIGHT LANE MARKER Y[m] AWAY | PRESENT | PRESENT | 1 |
| LEFT LANE MARKER Y[m] AWAY | PRESENT | PRESENT | 1 |
| ... | ... | ... | ... |
| ... | ... | ... | ... |
| STOP LINE A | PRESENT | ABSENT | 0 |
| CROSSWALK A | PRESENT | PRESENT | 1 |
| STOP LINE B | ABSENT | PRESENT | 0 |
| CROSSWALK B | PRESENT | ABSENT | 0 |
| ... | ... | ... | ... |

FIG. 18

| SOLID OBJECT INFORMATION | INFORMATION OF PERIPHERAL ENVIRONMENT STORAGE UNIT | INFORMATION OF IMAGE RECOGNITION DEVICE | SIMILARITY DETERMINATION |
|---|---|---|---|
| ... | ... | ... | ... |
| TRAFFIC LIGHT A | PRESENT | PRESENT | 1 |
| SIGN A | PRESENT | ABSENT | 0 |
| SIGN B | PRESENT | PRESENT | 1 |
| SOLID OBJECT A | PRESENT | PRESENT | 1 |
| SOLID OBJECT B | PRESENT | ABSENT | 0 |
| ... | ... | ... | ... |
| ... | ... | ... | ... |
| TRAFFIC LIGHT B | PRESENT | PRESENT | 1 |
| TRAFFIC LIGHT C | PRESENT | PRESENT | 1 |
| SIGN C | PRESENT | PRESENT | 1 |
| SOLID OBJECT C | PRESENT | ABSENT | 0 |
| ... | ... | ... | ... |

DRIVE CONTROL SYSTEM

TECHNICAL FIELD

The present invention relates to a self-driving system that detects road surface display such as lane markers and stop positions of a road around an own vehicle, detects solid objects such as a plurality of moving objects/obstacles around the own vehicle, determines a drive area on the road, and drives on a preset drive route while avoiding collisions with the solid objects or a driving-assisting system that assists an operation of a driver. Particularly, the present invention relates to a drive control system that, when the road surface display around the own vehicle and the solid objects such as the moving objects and the obstacles are detected using external world recognition sensors mounted on the own vehicle, determines detection performances of the external world recognition sensors and changes control of the self-driving system or the driving-assisting system according to the detection performances of the external world recognition sensors.

BACKGROUND ART

Conventionally, in addition to solid objects such as obstacles and moving objects around an own vehicle, road surface display (road surface paints) such as lane markers and stop lines on a road or solid objects such as traffic lights and signs existing around the road are recognized as information of an external world around the own vehicle and drive control according to an external world peripheral situation of the own vehicle is performed, to realize a self-driving system or a driving-assisting system of a vehicle. To recognize the external world peripheral situation by in-vehicle sensors and perform control, it is necessary to determine vehicles, bicycles, and pedestrians to be types of a plurality of obstacles or a plurality of moving objects around the own vehicle and detect information such as positions and speeds thereof. In addition, when the own vehicle drives, it is necessary to determine meanings of paints such as the lane markers and the stop lines or meanings of the signs on the road. As the in-vehicle sensors to detect the information of the external world around the own vehicle, image recognition units using cameras are effective. However, when an external environment is recognized using the image recognition units using the cameras, detection performances of the image recognition units using the cameras are changed by an external environment around the own vehicle such as weather (rainy weather and foggy weather) and a time zone (night, crepuscule, and backlight). Specifically, for detection of the moving objects, the obstacles, and the road paints around the own vehicle, erroneous detection or non-detection by the image recognition units increases.

When the performances of the image recognition units are degraded, the image recognition units do not recognize whether there are the moving objects, the obstacles, and the road paints around the own vehicle. For this reason, it may be difficult to correctly determine a status of the erroneous detection or the non-detection by only the image recognition units.

For the above problem, an example of a road information recognition device determining a front road shape of the own vehicle finally from a curve shape acquired from a navigation map and a curve shape detected by the image recognition units, with respect to the front road shape of the own vehicle, is described in PTL 1.

In PTL 1, a first road information determination unit obtaining first road information on the basis of map information held by a navigation device, a second road information detection unit detecting a road situation during drive and obtaining second road information on the basis of the road situation, and a road information determination unit obtaining final road information on the basis of the first road information and the second road information are included. Specifically, a front curve is detected from the navigation map with respect to the first road information, the front curve is detected from in-vehicle cameras with respect to the second road information, and the front curve is finally determined from detection results.

CITATION LIST

Patent Literature

PTL 1: JP H11-211492 A

SUMMARY OF INVENTION

Technical Problem

According to the contents described in PTL 1, the road shape, such as the straight line and the curve of the road, acquired from the navigation map and the road shape, such as the straight line and the curve of the front road, acquired by the image recognition units are compared and the front road shape is finally determined. For this reason, only the determination for the front road shape is performed. However, in the self-driving system or the driving-assisting system for performing the collision avoidance, it may be difficult to execute the vehicle drive control securely by determining only information of the front road shape. For example, in the case in which the moving objects or the obstacles exist in a travelling direction of the own vehicle, when detection of the moving objects or the obstacles existing in front of the own vehicle cannot be determined by the image recognition units even if the front road shape can be determined by the image recognition units and the navigation map and a drive road of the own vehicle can be determined, corresponding obstacle information does not exist in the navigation map. For this reason, it is difficult to determine solid objects. As a result, because it is difficult to determine whether the front obstacles are not detected by the image recognition units or the solid obstacles do not exist, it may be difficult to determine whether drive control of the vehicle is executed or cancelled.

For the above problems, the present invention provides a secure self-driving system or a driving-assisting system.

Solution to Problem

A drive control system according to the present invention is a drive control system having image recognition units to detect a peripheral environment of a vehicle and a drive control device to control drive of the vehicle, and the drive control system includes: a peripheral environment storage unit which stores the peripheral environment of the vehicle, wherein a mode of drive control executed by the drive control device is changed on the basis of statuses of detection performances of the image recognition units acquired on the basis of information of the peripheral environment stored in the peripheral environment storage unit and detection information by the image recognition units.

In addition, a drive control system according to the present invention is a drive control system having image recognition units to detect a peripheral environment of a vehicle and a drive control device to control drive of the vehicle, and the drive control system includes: a peripheral environment storage unit which stores the peripheral environment of the vehicle, wherein statuses of detection performances of the image recognition units are reported on the basis of information of the peripheral environment stored in the peripheral environment storage unit and detection information by the image recognition units.

Advantageous Effects of Invention

According to the present invention, security of a self-driving system or a driving-assisting system can be improved.

BRIEF DESCRIPTION OF DRAWINGS

FIG. 2(B) FIG. 2B illustrates another example of external world recognition areas by image recognition devices 80 mounted on an own vehicle 100.

FIG. 13 is a diagram illustrating information of a peripheral environment stored in a peripheral environment storage unit according to this embodiment.

FIG. 17 is a diagram illustrating an embodiment of determining a similarity degree from road surface information stored in a peripheral environment storage unit and road surface information detected by image recognition devices, in a drive control system according to this embodiment.

FIG. 18 is a diagram illustrating an embodiment of determining a similarity degree from solid object information stored in a peripheral environment storage unit and solid object information detected by image recognition devices, in a drive control system according to this embodiment.

DESCRIPTION OF EMBODIMENTS

Figure 1:
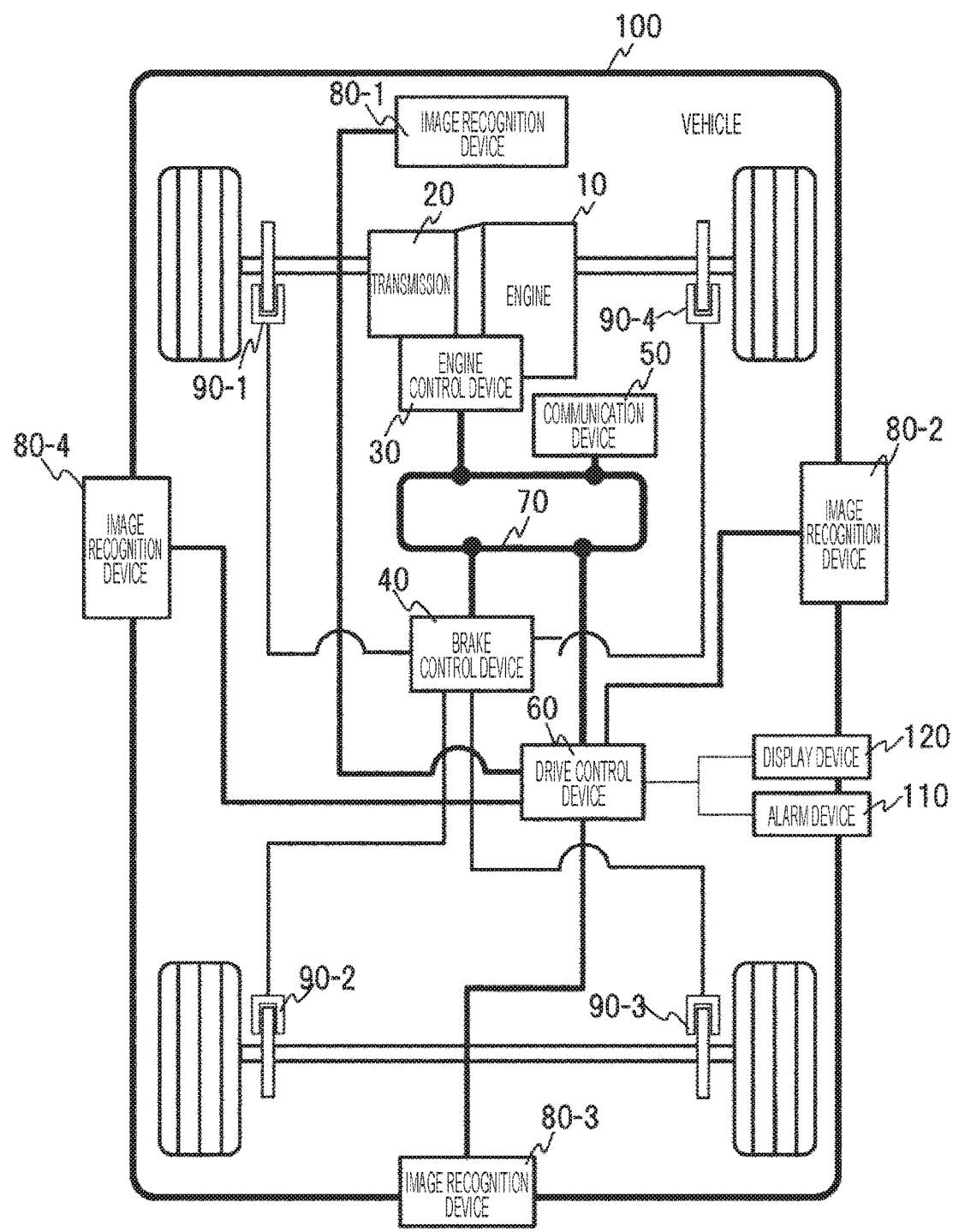
FIG. 1 is a diagram illustrating an entire configuration of an embodiment of a vehicle on which a drive control system according to this embodiment is mounted.

First, an outline of the present invention will be described. A drive control system according to the present invention is a drive control system having image recognition units to detect a peripheral environment of an own vehicle and a drive control device to execute drive control of self driving or driving assisting of the own vehicle. The drive control system has a peripheral environment storage unit which stores the peripheral environment of the vehicle. A mode of the drive control executed by the drive control device is changed or statuses of detection performances of the image recognition units are reported, on the basis of information of the peripheral environment stored in the peripheral environment storage unit and detection information by the image recognition units. The drive control system has the peripheral environment storage unit which stores information regarding the peripheral environment of the vehicle and can determine whether the image recognition units can detect the peripheral environment of the vehicle from results detected by the image recognition units and the information stored in the peripheral environment storage unit. The control is changed to drive control according to image recognition performance, on the basis of a determination result, so that optimal drive control of the self driving or the driving assisting can be realized.

Further, the drive control system according to the present invention has the peripheral environment storage unit which stores the peripheral environment of the vehicle. Similarity degrees of comparison target objects stored in the peripheral environment storage unit and target objects detected by the image recognition units are calculated, the mode of the drive control of the self driving or the driving assisting executed by the drive control device is changed on the basis of the similarity degrees or the detection performances of the image recognition units are determined on the basis of the similarity degrees, and the statuses of the detection performances of the image recognition units are reported. The detection performances of the image recognition units can be determined from the information regarding the peripheral environment of the vehicle stored in the peripheral environment storage unit and the similarity degrees of the results detected by the image recognition units. The control is changed to the drive control, on the basis of the detection performances, so that optimal drive control of the self driving or the driving assisting can be realized.

Further, the drive control system according to the present invention has the peripheral environment storage unit which stores the peripheral environment of the vehicle. Similarity degrees of target objects detected by the image recognition units at a plurality of different points where the vehicle drives and comparison target objects stored in the peripheral environment storage unit and corresponding to the plurality of different points are calculated, the detection performances of the image recognition units are determined from the similarity degrees, and the mode of the drive control such as the self driving or the driving assisting is changed by the drive control device on the basis of the detection performances or the statuses of the detection performances of the image recognition units are reported on the basis of the detection performances. In the environment of the road on which the vehicle drives, even when an amount of information showing the feature of the peripheral environment is small, the similarities can be calculated for the comparison target objects at the plurality of different points where the own vehicle drives. Therefore, the detection performances of the image recognition units can be determined.

Further, the drive control system according to the present invention calculates two similarity degrees of a first similarity degree showing a similarity degree of a feature amount regarding a road surface of a road around the vehicle, stored in the peripheral environment storage unit, and a feature amount regarding the road surface of the road, detected by the image recognition units, and a second similarity degree showing a similarity degree of a feature amount regarding a solid object, stored in the peripheral environment storage unit, and a feature amount regarding the solid object around the road, detected by the image recognition units. The drive control system changes the control of the drive control device such as the self driving and the driving assisting or reports the statuses of the detection performances of the image recognition units, according to the two similarity degrees. Detection performance regarding road surface information such as a lane marker and a stop line on the road surface and detection performance of the solid object around the road can be individually determined and the detection performances of the image recognition units can be determined precisely. As a result, precise drive control of the self driving or the driving assisting or specific reporting is enabled.

Hereinafter, an embodiment of the present invention will be described using the drawings.

FIG. 1 illustrates an outline of an entire configuration of an embodiment of a vehicle on which a drive control system according to the present invention is mounted.

In FIG. 1, an upper side shows a front side of a vehicle 100 and a lower side shows a rear side of the vehicle 100. The vehicle 100 is driven by an engine 10 to drive the vehicle 100, a transmission 20 to transmit power of the engine 10, and an engine control device 30 to control the engine 10. In an example of FIG. 1, the engine 10 and the transmission 20 are mounted on the front side and tires of the front side are driven. However, the present invention can be applied to the case in which tires of the rear side are driven or all of four wheels are driven.

In addition to the engine control device 30 to control the engine 10 and the transmission 20, a plurality of control devices such as a vehicle control device 60 to wholly control the vehicle, a communication device 50 to perform communication with the outside, a brake control device 40 to control braking devices (90-1, 90-2, 90-3, and 90-4) provided in tires of the four wheels of the vehicle 100 are mounted on the vehicle 100. These control devices are connected to a network 70 for control and communicate information to each other. In the embodiment of FIG. 1, the drive control device 60 is mounted on the vehicle 100 and receives information of an external world around the vehicle 100, acquired by image recognition devices (80-1, 80-2, 80-3, and 80-4) acquiring the external world information, and information of a vehicle status amount (a speed, a yaw rate, a yaw angle, forward and backward acceleration, lateral acceleration, and a steering angle), showing a status of the vehicle 100, and controls the vehicle 100 according to the external world information. The vehicle status amount showing the status of the vehicle 100 is detected by a yaw rate sensor, an acceleration sensor, a speed sensor, and a steering angle sensor not illustrated in FIG. 1.

The communication device 50 is a device to perform communication with the outside and acquires road surface information (road surface paint types and positions, such as lane marker positions, stop line positions, and crosswalks) and solid object information (solid objects existing around a road, such as signs, traffic lights, and planimetric features) as peripheral road information at the time of drive. Although described later, for the above information, information detected by sensors installed on a road infrastructure, road peripheral information (road surface information and solid object information) stored in a data center, and road peripheral information (road surface information and solid object information) detected by other vehicle can be acquired using the communication device 50. In addition, the peripheral road information at the time of drive stored in advance can be changed to latest information using the communication device 50.

The image recognition devices 80 (80-1, 80-2, 80-3, and 80-4) are devices that acquire information of the external world around the vehicle 100. As a specific example, there is image recognition by cameras. As the cameras, there are a monocular camera recognizing the external world by one camera and a stereo camera recognizing the external world by two cameras. In the image recognition by the cameras, a plurality of moving objects moving around the vehicle 100, such as a vehicle, a pedestrian, and a light vehicle (bicycle), can be recognized simultaneously as external information of the vehicle 100 and characteristics of the moving objects can be classified. In addition, the stereo camera is used, so that relative distances of moving objects or obstacles existing around the vehicle 100 can be detected. In addition, in the image recognition by the cameras, information such as positions and sizes of the lane markers (white lines), positions of the stop lines, and positions of the crosswalks can be acquired as the road surface information painted on the road. In addition, information of types, sizes, and positions of signs existing at sides of the road, information of sizes and positions of traffic lights, and other information of a position of a specific solid planimetric feature can be acquired as the solid objects. When the stereo camera is used, a distance to the detected solid object or road surface paint can be detected using parallax images of the two cameras.

In an image of one camera, a distance of the detected road surface paint or image information can be detected using a camera coordinate system set previously for each camera. Further, the image of one camera and a distance detection sensor, for example, radar are combined, so that precision of the distance detection can be improved.

An alarm device 110 and a display device 120 display performance statuses of the image recognition devices 80 determined in the drive control device 60 or report the performance statuses of the image recognition devices 80 to a driver. Alternatively, the alarm device 110 and the display device 120 previously report or display a change of control executed by the drive control device 60, according to the performance statuses of the image recognition devices 80.

Figure 2A:
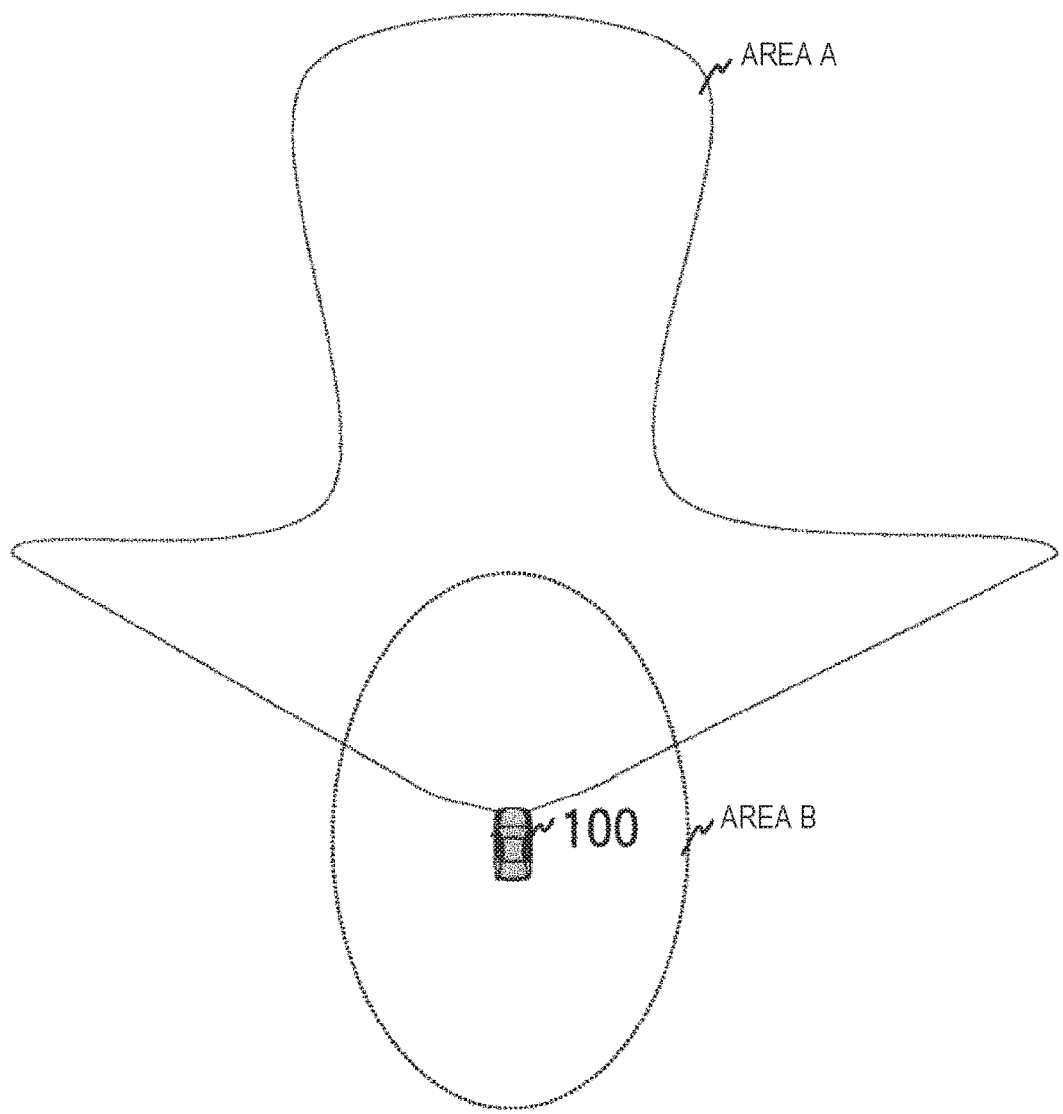
FIG. 2(A) FIG. 2A illustrates an example of external world recognition areas by image recognition devices 80 mounted on an own vehicle 100.

FIG. 2(A) illustrates an example of external world recognition areas by the image recognition devices 80 mounted on the own vehicle 100. FIG. 2(B) illustrates another example of the external world recognition areas by the image recognition devices 80 mounted on the own vehicle 100. In the cases of FIGS. 2(A) and 2(B), the own vehicle 100 uses cameras in an image recognition device 80-1 performing external world recognition of a front side of the own vehicle 100, an image recognition device 80-2 performing external world recognition of a right side of the own vehicle 100, an image recognition device 80-3 performing external world recognition of a left side of the own vehicle 100, and an image recognition device 80-4 performing external world recognition of a rear side of the own vehicle 100, which correspond to the image recognition devices 80, like the embodiment of FIG. 1. Particularly, in FIG. 2(A), the image recognition device 80-1 performing the external world recognition of the front side can recognize both external world information near a wide angle and distant external world information and can detect road surface information and solid object information existing in a range of an area A, by one image recognition device. That is, road surface information such as lane markers (white lines), stop lines, and crosswalks of the road and information of solid objects such as front vehicles, oncoming vehicles, signs, and traffic lights, existing in front of the own vehicle 100, can be detected.

Meanwhile, in the case of FIG. 2(B), the image recognition device 80-1 uses two image recognition devices and individually detects a near area A2 of a wide angle and a distant area A1. Even in this case, similar to FIG. 2(A), road surface information such as lane markers (white lines), stop lines, and crosswalks of a road and information of solid objects such as front vehicles, oncoming vehicles, signs, and traffic lights, existing in front of the own vehicle 100, can be detected.

In addition, in FIGS. 2(A) and 2(B), external world information of left and right sides and a rear side of the own vehicle 100 as well as the front side can be detected and road surface information such as lane markers (white lines), stop lines, and crosswalks of a road and information of solid objects such as front vehicles, oncoming vehicles, signs, and traffic lights, existing in the area B, can be detected. In this case, peripheral information in an area that can be detected by each of the image recognition devices 80-1 to 80-4 can be acquired from a peripheral environment storage unit and detection performance of image recognition for each of the image recognition devices 80-1 to 80-4 can be determined.

Figure 3:
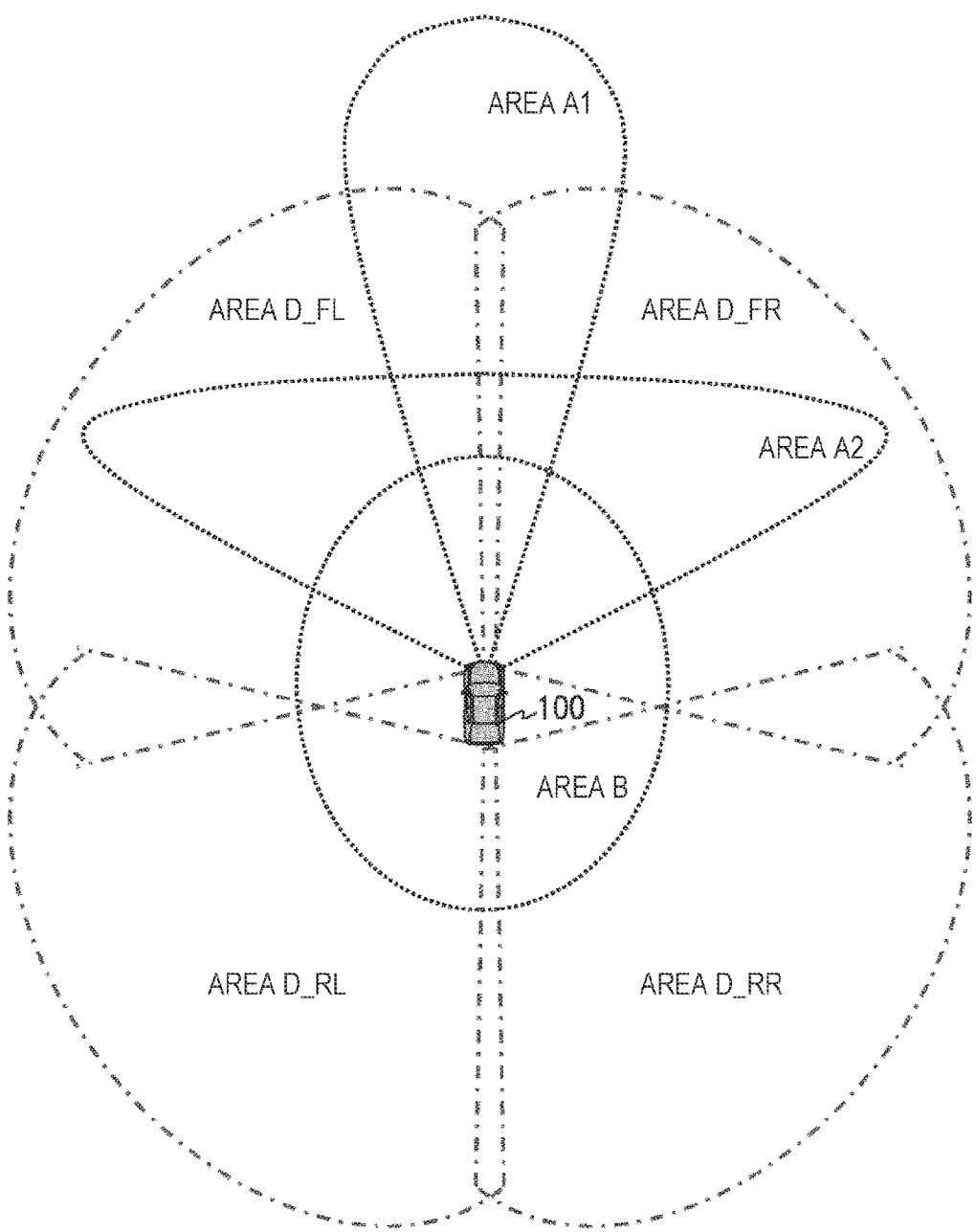
FIG. 3 is a diagram illustrating a configuration of another embodiment of an external world detection unit according to this embodiment.

FIG. 3 illustrates another embodiment of external world recognition areas by the image recognition devices 80 mounted on the own vehicle 100. In FIG. 3, the areas A1, A2, and B described in the embodiment of FIG. 2(B) are recognized using the image recognition devices 80 using the cameras and radar sensors different from the cameras are mounted around the own vehicle 100 to detect an entire peripheral portion of the own vehicle 100 by radars.

It is difficult for the radars to identify the moving objects and the obstacles. However, distances and speeds of the moving objects and the obstacles can be detected with relatively high precision as compared with the cameras. In the embodiment of FIG. 3, the radars are mounted in left and right four places of the front and rear sides of the own vehicle 100 and distances and speeds of moving objects and obstacles of areas D_FL, D_FR, D_RL, and D_RR are detected. By this configuration, identification of the road surface information or the solid objects around the vehicle 100 is performed by the cameras and distances of the solid objects are detected by the radars, so that the solid objects can be detected with higher precision.

Figure 4:
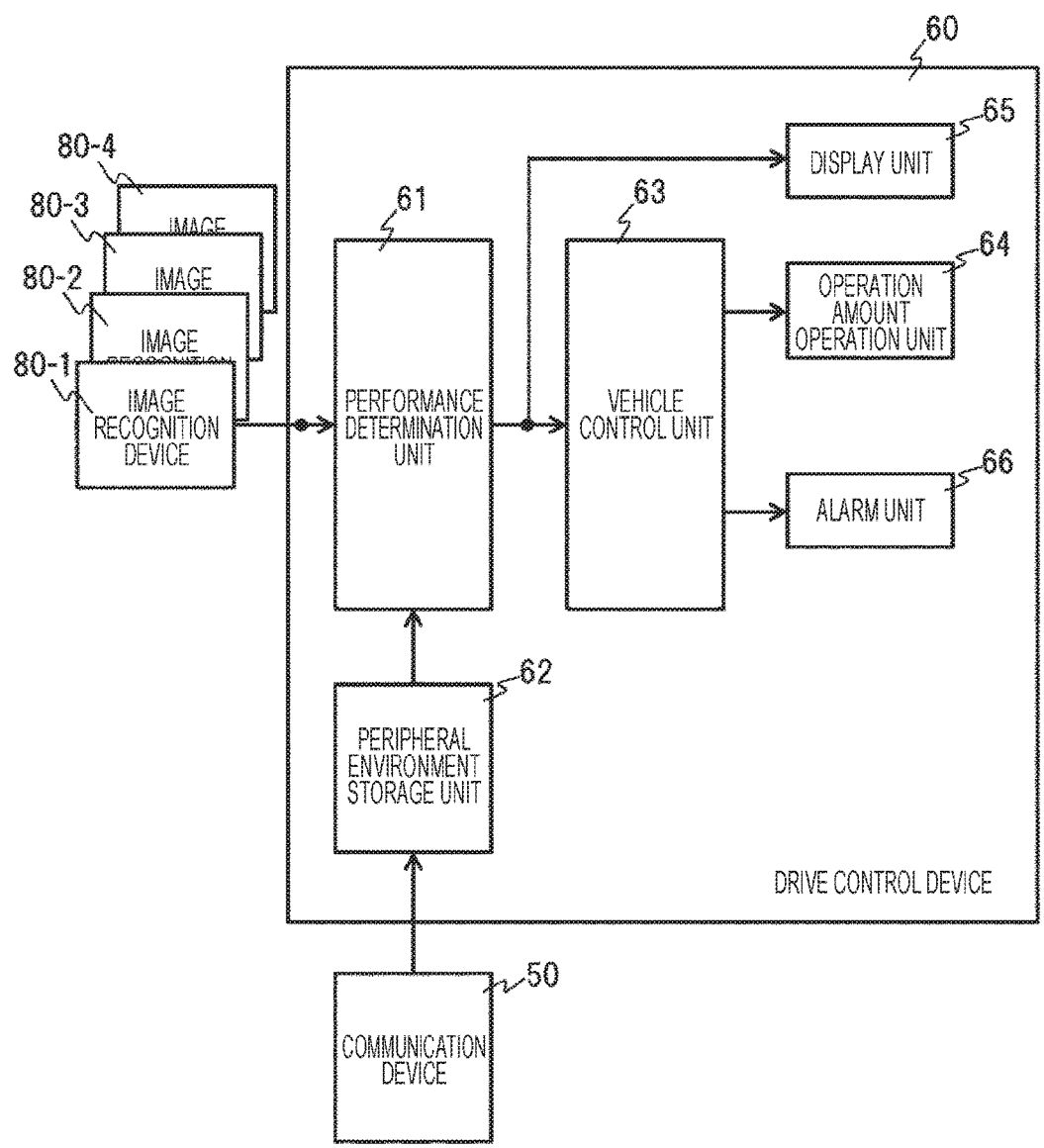
FIG. 4 is a diagram illustrating an embodiment of a drive control device according to this embodiment.

FIG. 4 illustrates an embodiment of a specific configuration of the drive control device 60 illustrated in FIG. 1. Peripheral environment information of the own vehicle 100 detected by the image recognition devices 80-1 to 80-4 is input to the drive control device 60. In the embodiment of FIG. 4, the drive control device 60 includes a performance determination unit 61, a peripheral environment storage unit 62, a vehicle control unit 63, an operation amount operation unit 64, a display unit 65, and an alarm unit 66.

The performance determination unit 61 receives peripheral information detected by the image recognition devices 80-1 to 80-4 and peripheral environment information of a position of the own vehicle 100 stored in the peripheral environment storage unit 62 and determines detection performances of the image recognition devices 80-1 to 80-4. Determination results of the detection performances of the image recognition devices 80-1 to 80-4 determined by the performance determination unit 61 are output to the vehicle control unit 63. In the vehicle control unit 63, reporting of a drive control method of the own vehicle 100 and the performances of the image recognition devices 80-1 to 80-4 to a driver is determined on the basis of the determination results of the detection performances of the image recognition devices 80-1 to 80-4 acquired by the performance determination unit 61.

For example, in the case in which automatic steering control to detect a lane marker in front of the own vehicle 100 and maintain a center position of a lane and automatic acceleration/deceleration control according to an obstacle or a moving object in front of the vehicle are executed by the vehicle control unit 63 according to selection of the driver, when it is determined that the detection performances of the image recognition devices 80-1 to 80-4 are not degraded, the vehicle control device 63 continuously executes the automatic steering control and the automatic acceleration/deceleration control to be executed at the present time.

In addition, when it is determined that the detection performances of the image recognition devices 80-1 to 80-4 are degraded, information showing that the detection performances of the peripheral environment by the image recognition devices 80-1 to 80-4 are degraded and information showing that the automatic steering control and the automatic acceleration/deceleration control to be executed at the present time are cancelled are reported to the driver by the alarm unit 66. Then, the automatic steering control and the automatic acceleration/deceleration control are canceled, so that a control mode of drive control is switched. At this time, statuses of the detection performances of the image recognition devices 80-1 to 80-4 determined by the performance determination unit 61 are displayed by the display unit 65. The peripheral environment information stored in the peripheral environment storage unit 62 can be acquired from the data center managing the peripheral environment information, using the communication device 50.

Figure 5:
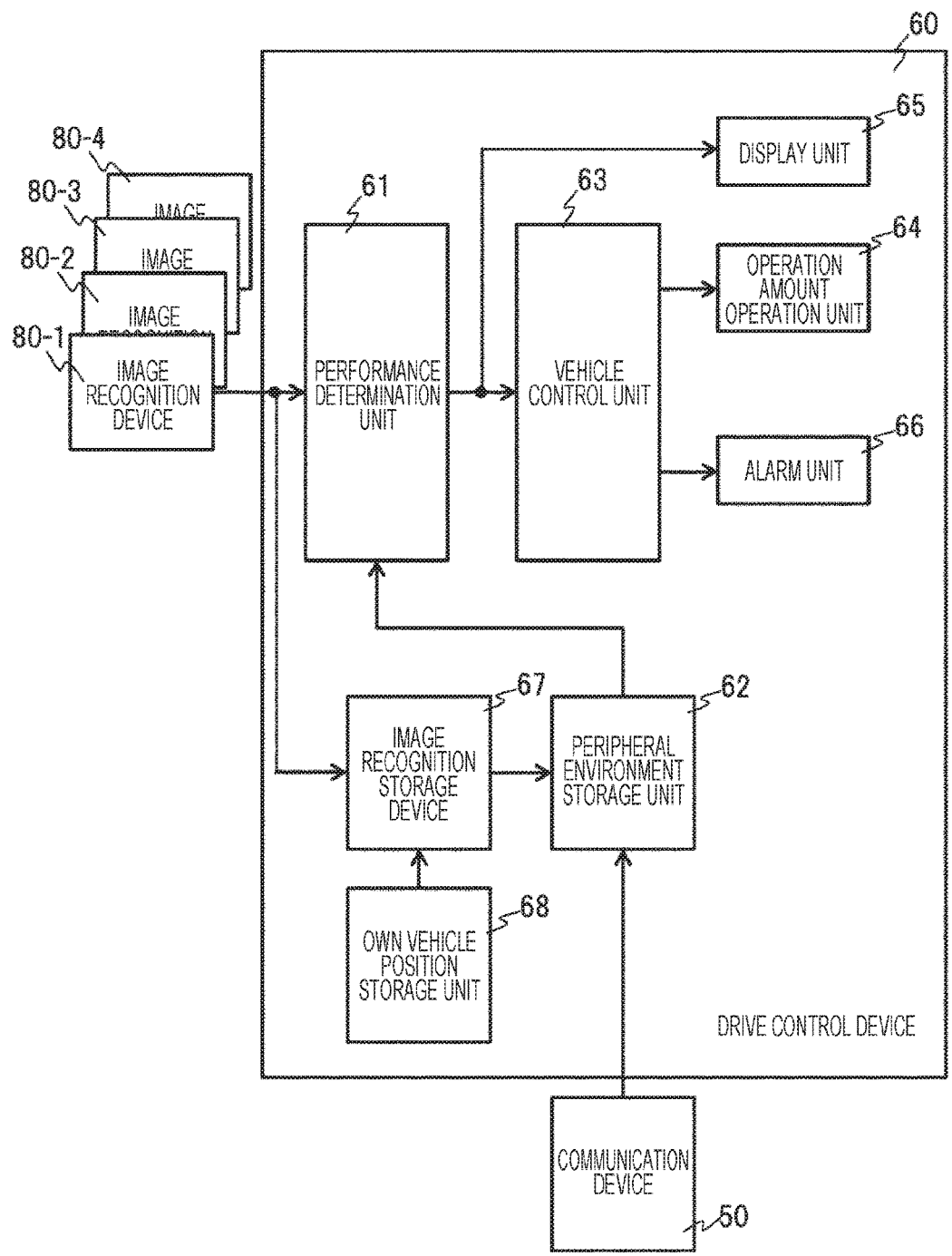
FIG. 5 is a diagram illustrating another embodiment of a drive control device according to this embodiment.

FIG. 5 illustrates another embodiment of the specific configuration of the drive control device 60 illustrated in FIG. 1. Similar to FIG. 4, the peripheral environment information of the own vehicle 100 detected by the image recognition devices 80-1 to 80-4 is input to the drive control device 60.

In the embodiment of FIG. 5, the drive control device 60 includes an image recognition storage unit 67 and an own vehicle position storage unit, in addition to the performance determination unit 61, the peripheral environment storage unit 62, the vehicle control unit 63, the operation amount operation unit 64, the display unit 65, and the alarm unit 66.

Similar to FIG. 4, the performance determination unit 61 receives the peripheral information detected by the image recognition devices 80-1 to 80-4 and the external world environment information around the position of the own vehicle 100 stored in the peripheral environment storage unit 62 and determines the detection performances of the image recognition devices 80-1 to 80-4. Determination results of the detection performances of the image recognition devices 80-1 to 80-4 determined by the performance determination unit 61 are output to the vehicle control unit 63.

In the vehicle control unit 63, reporting of a drive control method of the own vehicle 100 and the performances of the image recognition devices 80-1 to 80-4 to the driver is determined on the basis of the determination results of the detection performances of the image recognition devices 80-1 to 80-4 acquired by the performance determination unit 61. In the embodiment of FIG. 5, the peripheral environment information stored in the peripheral environment storage unit 62 is acquired from the image recognition storage device 67.

The image recognition storage unit 67 stores peripheral environment information acquired by the image recognition devices 80-1 to 80-4 at the time of past drive and the own vehicle position storage unit 68 stores a position of the own vehicle 100 when information stored in the image recognition storage unit 67 is acquired.

The peripheral environment storage unit 62 acquires information of a peripheral environment during current drive, from position information of the own vehicle of the own vehicle position storage unit 68 corresponding to the peripheral environment information stored in the image recognition storage unit 67. When there is not the peripheral environment information acquired by the image recognition devices 80-1 to 80-4 at the time of the past drive, the external world information around the road can be acquired, with reference to the own vehicle position information, from the data center managing the peripheral environment information using the communication device 50, similar to the embodiment of FIG. 4.

In addition, the peripheral environment information acquired by the image recognition devices 80-1 to 80-4 during drive of the own vehicle 100 can be stored in the image recognition storage unit 67 of the drive control device 60 of the own vehicle 100. However, an enormous storage capacity is necessary for storing the information acquired during the drive. Therefore, data of the peripheral environment information stored in the image recognition storage unit 67 can be transmitted from the own vehicle 100 to an external facility capable of storing a large capacity of data like the data center, using the communication device 50, and can be accumulated in a storage device of the external data center. At this time, peripheral environment information at a current position is extracted from a large capacity of peripheral environment information data, on the basis of current position information of the own vehicle 100, and the peripheral environment information at the position where the own vehicle 100 exists is output to the own vehicle 100 using the communication device 50. As such, the peripheral environment information is managed in the data center installed outside the own vehicle 100 in a format of data linked with the position information of the own vehicle, so that internal processing or an accumulated data amount of the own vehicle 100 can be limited.

Figure 6:
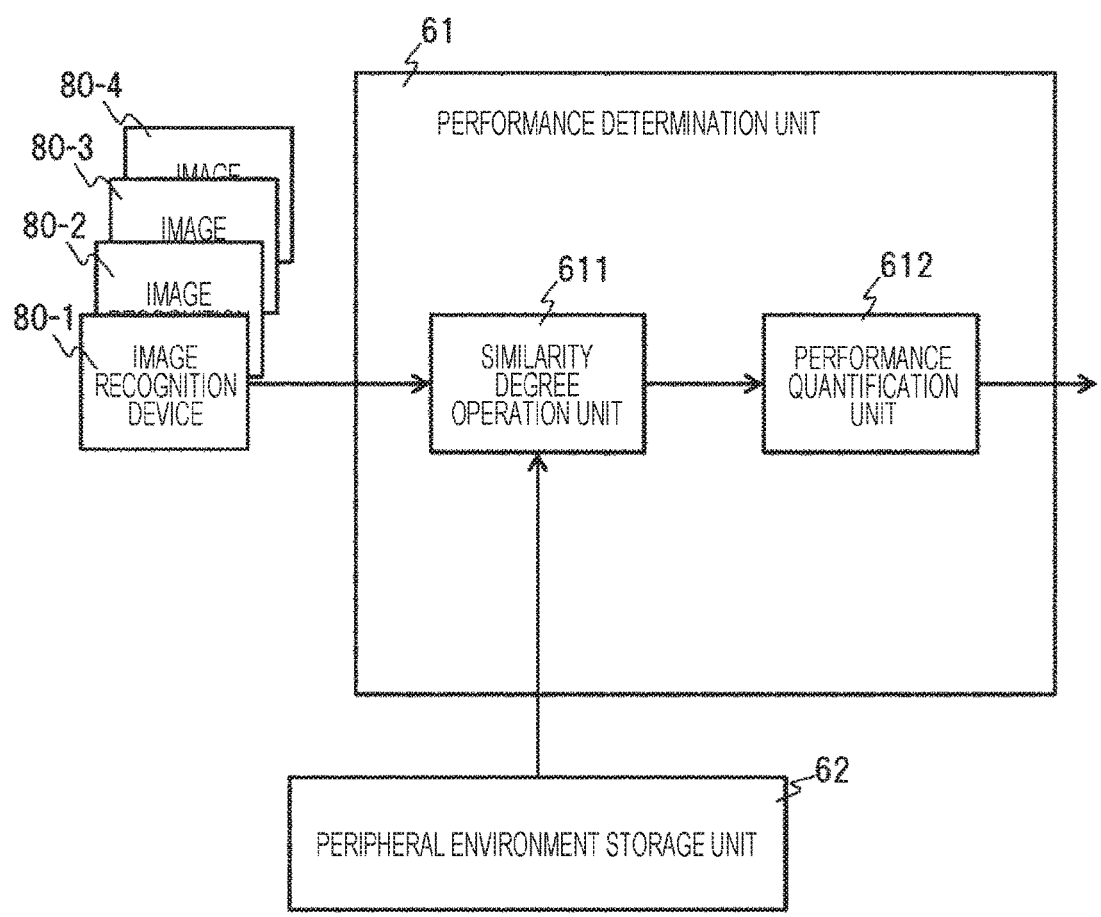
FIG. 6 is a diagram illustrating an embodiment of a performance determination unit in a drive control device according to this embodiment.

FIG. 6 illustrates an embodiment of a specific configuration of the performance determination unit 61 in the drive control device 60 of FIGS. 4 and 5. In the embodiment of FIG. 6, the performance determination unit 61 includes a similarity degree operation unit 611 and a performance quantification unit 612.

The information of the peripheral environment of the own vehicle 100 detected by the image recognition devices 80-1 to 80-4 and the information of the current peripheral environment stored in the peripheral environment storage unit 62 are input to the similarity degree operation unit 611. The similarity degree operation unit 611 evaluates whether peripheral detection results by the image recognition devices 80-1 to 80-4 and corresponding target objects stored in the peripheral storage unit 62 are matched, from the information of the peripheral environment of the own vehicle 100 detected by the image recognition devices 80-1 to 80-4 mounted on the own vehicle 100 and the information of the peripheral environment of the own vehicle 100 of the current position stored in the peripheral environment storage unit 62, and operates a similarity degree.

For example, when the image recognition devices 80-1 to 80-4 detect 10 feature amounts (road surface information such as stop lines or solid objects such as signs) from the peripheral environment, feature amounts (road surface information such as stop lines or solid objects such as signs) corresponding to the feature amounts are acquired from the peripheral environment storage unit 62, and the feature amounts are completely matched, it is determined that a similarity degree is high. When the matched feature amounts are small, it is determined that the similarity degree is low. Here, the detection results of the peripheral environment detected by the image recognition devices 80-1 to 80-4 may be detected from image data at certain time and may be detected from a plurality of image data at a plurality of points in predetermined time.

The similarity degree operated by the similarity degree operation unit 611 is input to the performance quantification unit 612 and the detection performance of each of the image recognition devices 80-1 to 80-4 is quantified by the performance quantification unit 612. For example, the detection performance of the image recognition device 80-1 is quantified from a similarity degree of the feature amounts detected by the image recognition device 80-1 and the feature amounts acquired by the peripheral environment storage unit 62 and the detection performances of the image recognition devices 80-2 to 80-4 are quantified from similarity degrees in the same way.

As the quantification, when the similarity degree is high, the detection performance is quantified high and when the similarity degree decreases even a little bit, the detection performance greatly decreases and the similarity degree and the detection performance do not need to be in a proportional relation. When the similarity degree decreases, this means that non-detection and erroneous detection of the image recognition devices 80-1 to 80-4 increase. For this reason, it is thought that the detection performance cannot be used for self driving or driving assisting, when the similarity degree is less than a predetermined threshold. Therefore, the detection performance can be set to greatly decrease.

Figure 7:
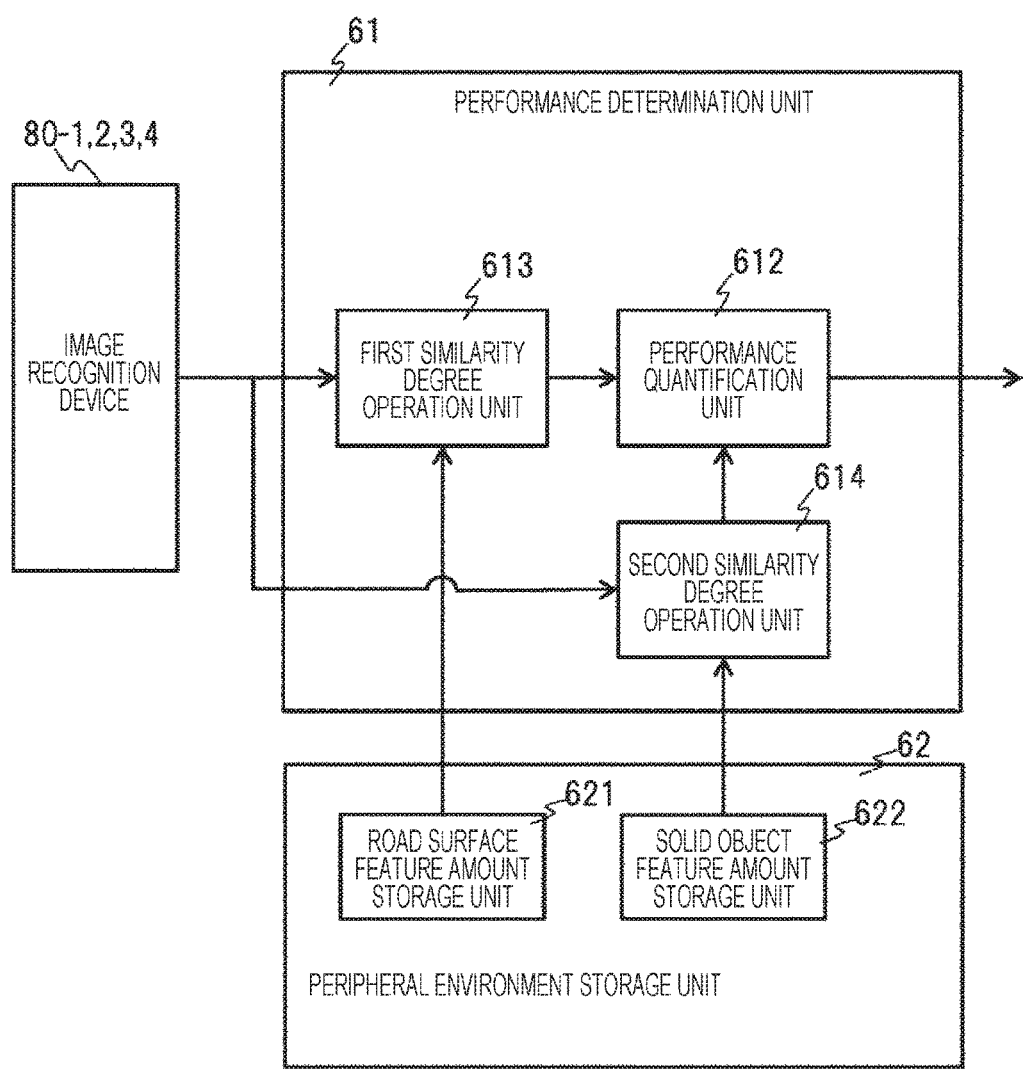
FIG. 7 is a diagram illustrating another embodiment of a performance determination unit in a drive control device according to this embodiment.

FIG. 7 illustrates another embodiment of a specific configuration of the performance determination unit 61 in the drive control device 60 of FIGS. 4 and 5. In the embodiment of FIG. 7, the performance determination unit 61 includes a first similarity degree operation unit 613, a second similarity degree operation unit 614, and a performance quantification unit 612. The peripheral environment storage unit 62 includes a road surface feature amount storage unit 621 that stores information regarding the road surface as the peripheral environment information and a solid object feature amount storage unit 622 that stores information regarding the solid objects as the peripheral environment information.

The first similarity degree operation unit 613 in the performance determination unit 61 receives detection results (road surface paint position information such as lane marker positions, stop line positions, and crosswalk positions) regarding the road surface around the vehicle, which are detected by the image recognition devices 80-1 to 80-4, and information (road surface paint position information such as lane marker positions, stop line positions, and crosswalk positions) regarding the road surface stored in the road surface feature amount storage unit 621 of the peripheral environment storage unit 62 and operates a similarity degree of the detection results of the image recognition devices 80-1 to 80-4 for the road surface around the own vehicle 100 and the information of the road surface feature amount storage unit 621. For example, when the image recognition devices 80-1 to 80-4 detect 10 feature amounts (stop lines or crosswalks) regarding the road surface from the peripheral environment, feature amounts (stop lines or crosswalks) corresponding to the feature amounts are acquired from the road surface feature amount storage unit 621, and the feature amounts are completely matched, it is determined that a first similarity degree is high. When the matched feature amounts are small, it is determined that the first similarity degree is low. Here, the detection results of the peripheral environment detected by the image recognition devices 80-1 to 80-4 may be detected using image data at certain time and may be detected using a plurality of image data at a plurality of points in predetermined time.

The second similarity degree operation unit 614 in the performance determination unit 61 receives detection results (size or position information of fixed solid objects around the road, such as signs, traffic lights, and specific solid planimetric features) regarding the solid objects around the vehicle, which are detected by the image recognition devices 80-1 to 80-4, and information (size or position information of fixed solid objects around the road, such as signs, traffic lights, and specific solid planimetric features) regarding the solid objects around the road, which are stored in the solid object feature amount storage unit 622 of the peripheral environment storage unit 62, and operates a similarity degree of the detection results of the image recognition devices 80-1 to 80-4 for the solid objects around the own vehicle 100 and the information of the solid object feature amount storage unit 622. For example, when the image recognition devices 80-1 to 80-4 detect 10 feature amounts (signs or traffic lights) regarding the solid objects around the road from the peripheral environment, feature amounts (signs or traffic lights) corresponding to the feature amounts are acquired from the solid object feature amount storage unit 622, and the feature amounts are completely matched, it is determined that a second similarity degree is high. When the matched feature amounts are small, it is determined that the second similarity degree is low. Here, the detection results of the peripheral environment detected by the image recognition devices 80-1 to 80-4 may be detected using image data at certain time and may be detected using a plurality of image data at a plurality of points in predetermined time.

The similarity degree (first similarity degree) regarding the road surface information, operated by the first similarity degree operation unit 613, and the similarity degree (second similarity degree) regarding the solid objects around the road, operated by the second similarity degree operation unit 614, are input to the performance quantification unit 612 and the detection performance of the road surface information and the detection performance of the solid object information of each of the image recognition devices 80-1 to 80-4 are quantified by the performance quantification unit 612. Similar to the case of FIG. 6, the detection performances of each of the image recognition devices 80-1 to 80-4 are quantified from the first similarity degree and the second similarity degree for each of the image recognition devices 80-1 to 80-4.

As the quantification, when the similarity degree is high, the detection performance may be quantified high and when the similarity degree decreases even a little bit, the detection performance may greatly decrease and the similarity degree and the detection performance may be in a proportional relation. Instead of the proportional relation, when the similarity degree increases, the detection performance may be set to increase. When the similarity degree decreases, this means that non-detection and erroneous detection of the image recognition devices 80-1 to 80-4 increase. For this reason, it is thought that the detection performance cannot be used for self driving or driving assisting, when the similarity degree is less than a predetermined threshold. Therefore, the detection performance can be set to greatly decrease.

As such, in the embodiment of FIG. 7, for the detection performance of each of the image recognition devices 80-1 to 80-4, the two detection performances of the detection performance regarding the road surface information and the detection performance regarding the solid object information can be quantified. As a result, it is possible to perform a change of the drive control according to the detection performance, such as correspondence to the drive control affected by the detection performance regarding the road surface and correspondence to the drive control affected by the detection performance regarding the solid object.

Figure 8:
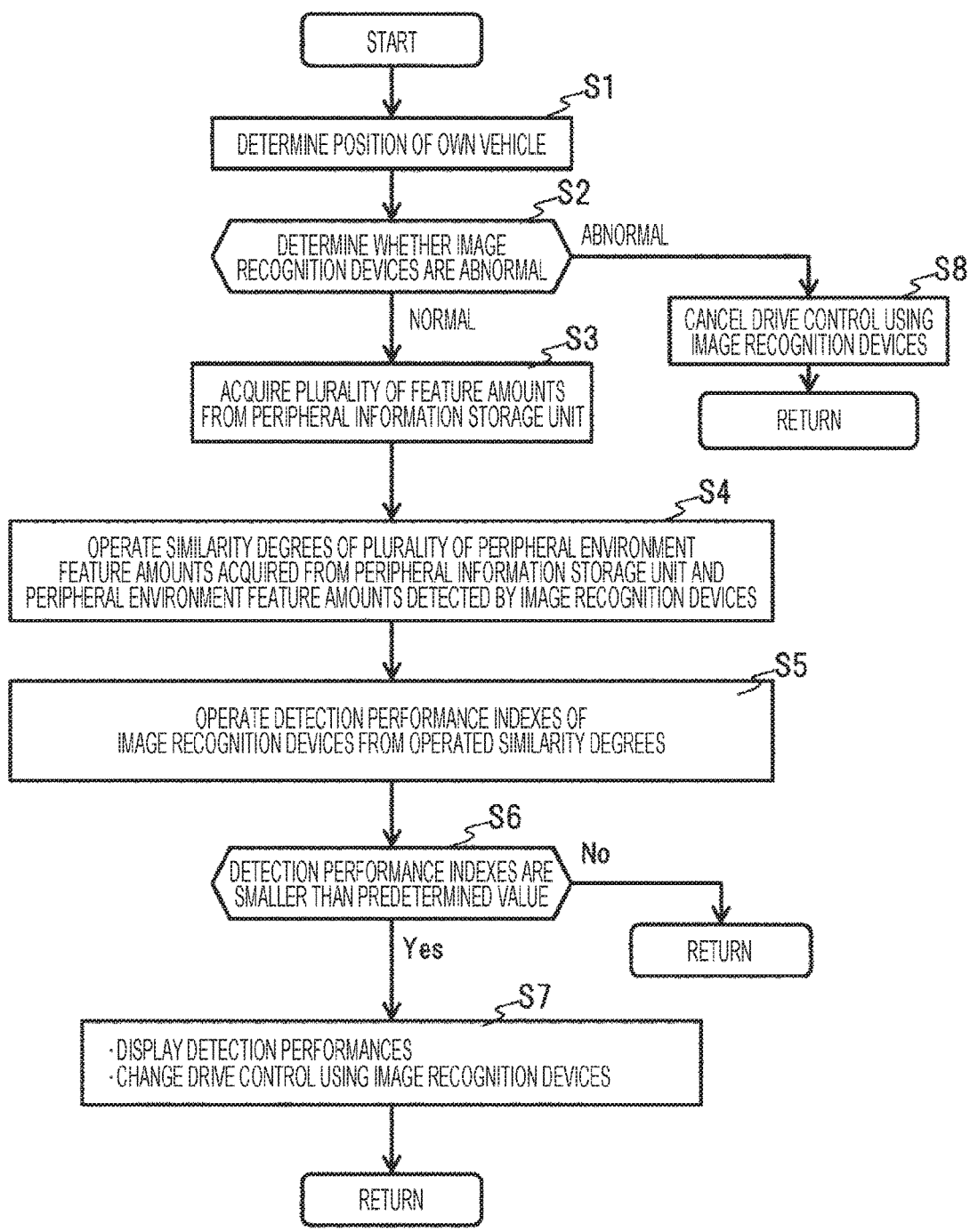
FIG. 8 is a diagram illustrating a flowchart of an embodiment of drive control according to this embodiment.

FIG. 8 is a diagram of an embodiment illustrating an outline of a flow when the similarity degree and the detection performance are operated using the image recognition devices 80-1 to 80-4 and the peripheral environment storage unit 62 and the drive control is changed according to results thereof, in this embodiment.

As illustrated in FIG. 8, first, a position of the own vehicle 100 is determined (S1). Here, the reason why the position of the own vehicle 100 is determined is that the peripheral information of the own vehicle 100 cannot be acquired from the peripheral information storage unit 62, when the position of the own vehicle 100 cannot be specified. As a method of specifying the position of the own vehicle 100, the position of the own vehicle 100 can be specified by combining a method of specifying a rough position of the own vehicle using a GPS, a method of estimating a movement of the own vehicle 100 from a speed, a steering angle, and a yaw rate of the own vehicle mounted on the own vehicle 100, and a method of acquiring information of a landmark by an external world recognition unit mounted on the own vehicle 100 and correcting the position of the own vehicle.

If the position of the own vehicle 100 can be specified, next, it is determined whether the image recognition devices 80-1 to 80-4 mounted on the own vehicle 100 are abnormal (S2). In this case, it is determined whether the image recognition devices 80-1 to 80-4 are abnormal as individual sensors, for example, the image recognition devices 80-1 to 80-4 cannot execute image recognition processing. Here, when it is determined that the image recognition devices 80-1 to 80-4 are abnormal, the drive control using the image recognition devices 80-1 to 80-4 is cancelled (S8).

Meanwhile, when it is determined that the image recognition devices 80-1 to 80-4 are normal, feature amounts of a plurality of peripheral information regarding a peripheral portion of the current position where the own vehicle 100 drives are acquired from the peripheral information storage unit 62 (S3).

Next, similarity degrees of a plurality of peripheral environment feature amounts acquired from the peripheral information storage unit 62 and peripheral environment feature amounts detected by the image recognition devices 80-1 to 80-4 are operated (S4).

If the similarity degrees are operated in S4, quantitative performance indexes for the detection performances of the image recognition devices 80-1 to 80-4 are operated from the operated similarity degrees (S5).

Next, magnitudes of the indexes of the detection performances operated in S5 are determined. Specifically, it is determined whether a predetermined threshold set in advance and the indexes of the detection performances are compared and the indexes of the detection performances are smaller than the predetermined threshold set in advance (S6). Here, when the operated indexes of the detection performances are larger than the predetermined threshold set in advance, it is determined that the detection performances are not degraded.

Meanwhile, when the operated indexes of the detection performances are smaller than the predetermined threshold set in advance, it is determined that the detection performances of the image recognition devices 80-1 to 80-4 are degraded and the degradations of the detection performances are displayed by the display device or are reported to the driver by an alarm. Because the drive control using the image recognition devices 80-1 to 80-4 may not be continuously executed according to the degradations of the detection performances of the image recognition devices 80-1 to 80-4, the drive control using the image recognition devices 80-1 to 80-4 is changed (S7). Specifically, in the case where drive control in which a lane marker existing in front of the own vehicle 100 is recognized and steering control and acceleration/deceleration control are executed not to deviate from a lane is executed, when it is determined that the detection performances of the image recognition devices 80-1 to 80-4 are degraded, it is determined that the detection performances of the lane marker by the image recognition devices 80-1 to 80-4 are also degraded, information showing that it is difficult to continuously execute a drive control mode in which the lane marker is recognized and the vehicle drives is reported, and a mode changes from the drive control mode in which the lane marker is recognized and the steering control and the acceleration/deceleration control are executed not to deviate from the lane to a manual control mode in which the driver performs the steering control and the acceleration/deceleration control.

Figure 9:
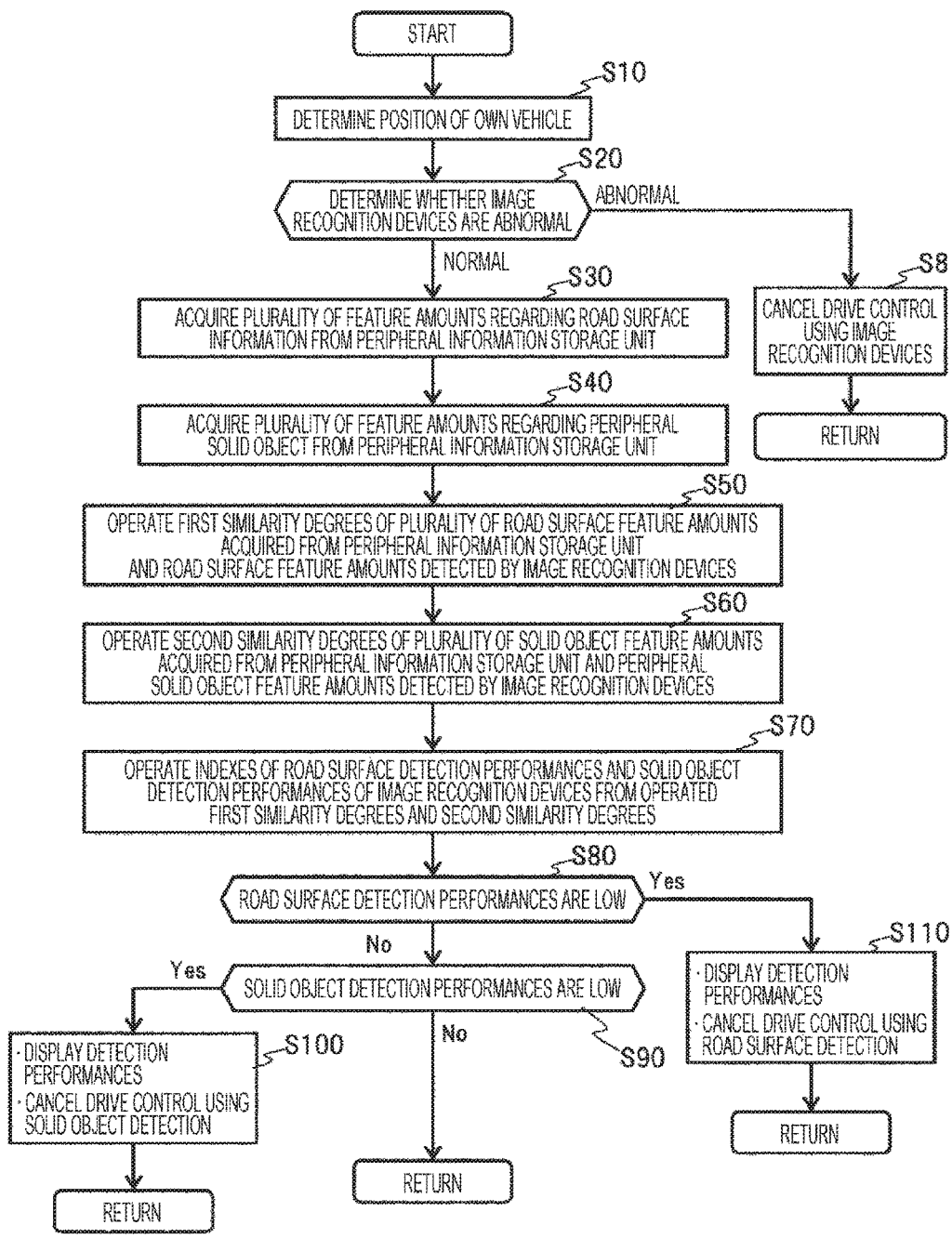
FIG. 9 is a diagram illustrating a flowchart of another embodiment of drive control according to this embodiment.

FIG. 9 is a diagram of another embodiment illustrating an outline of a flow when the similarity degree and the detection performance are operated using the image recognition devices 80-1 to 80-4 and the peripheral environment storage unit 62 and the drive control is changed according to results thereof, in this embodiment.

In a part of FIG. 9, the same processing as FIG. 8 is executed. In FIG. 9, first, a position of the own vehicle 100 is determined (S10). Similar to FIG. 8, the reason why the position of the own vehicle 100 is determined is that the peripheral information of the own vehicle 100 cannot be acquired from the peripheral information storage unit 62, when the position of the own vehicle 100 cannot be specified. As a method of specifying the position of the own vehicle 100, the position of the own vehicle 100 can be specified by combining a method of specifying a rough position of the own vehicle using a GPS, a method of estimating a movement of the own vehicle 100 from a speed, a steering angle, and a yaw rate of the own vehicle mounted on the own vehicle 100, and a method of acquiring information of a landmark by an external world recognition unit mounted on the own vehicle 100 and correcting the position of the own vehicle.

If the position of the own vehicle 100 can be specified, next, it is determined whether the image recognition devices 80-1 to 80-4 mounted on the own vehicle 100 are abnormal (S20). In this case, it is determined whether the image recognition devices 80-1 to 80-4 are abnormal as individual sensors, for example, the image recognition devices 80-1 to 80-4 cannot execute image recognition processing.

Here, when it is determined that the image recognition devices 80-1 to 80-4 are abnormal, the drive control using the image recognition devices 80-1 to 80-4 is cancelled (S8).

Meanwhile, when it is determined that the image recognition devices 80-1 to 80-4 are normal, feature amounts of a plurality of peripheral information regarding a peripheral portion of the current position where the own vehicle 100 drives are acquired from the peripheral information storage unit 62. As the acquisition of the feature amounts of the plurality of peripheral information, a plurality of feature amounts regarding the road surface information are acquired from the road surface feature amount storage unit 621 of the peripheral information storage unit 62 (S30) and a plurality of feature amounts regarding the peripheral solid objects are acquired from the solid object feature amount storage unit 622 of the peripheral information storage unit 62 (S40). Here, the plurality of feature amounts regarding the road surface information show positions or sizes of feature amounts of road surface displays (road surface paints) such as lane markers, stop lines, and crosswalks and the feature amounts of the solid objects show positions or sizes of signs, traffic lights, and specific solid planimetric features existing in the vicinity of the road.

Next, similarity degrees (first similarity degrees) of a plurality of feature amounts regarding the road surface information, acquired from the road surface feature amount storage unit 621 of the peripheral information storage unit 62, and a plurality of feature amounts regarding the road surface information, detected by the image recognition devices 80-1 to 80-4, are operated (S50).

In addition, similarity degrees (second similarity degrees) of a plurality of feature amounts regarding the peripheral solid objects, acquired from the solid object feature amount storage unit 622 of the peripheral information storage unit 62, and a plurality of feature amounts regarding the solid objects in the vicinity of the road, detected by the image recognition devices 80-1 to 80-4, are operated (S60).

In addition, indexes of two kinds of detection performances of road surface information detection performances of the image recognition devices 80-1 to 80-4 to detect the road surface information and solid object detection performances of the image recognition devices 80-1 to 80-4 to detect the solid objects are operated from the first similarity degrees and the second similarity degrees operated in S50 and S60.

Next, magnitudes of the indexes of the road surface information detection performances and the indexes of the solid object detection performances operated in S70 are determined (S80 and S90). In S80, the road surface information detection performances are determined and it is determined whether a predetermined threshold set in advance to determine the road surface information detection performances and the indexes of the road surface information detection performances are compared and the indexes of the road surface information detection performances are smaller than the predetermined threshold set in advance. For example, when the operated indexes of the road surface information detection performances are larger than the predetermined threshold for road surface information detection performance evaluation set in advance, it is determined that the road surface information detection performances are not degraded. Meanwhile, when the operated indexes of the road surface information detection performances are smaller than the predetermined threshold for the road surface information detection performance evaluation set in advance, it is determined that the road surface information detection performances of the image recognition devices 80-1 to 80-4 are degraded.

Likewise, in S90, the solid object detection performances are determined and it is determined whether a predetermined threshold set in advance to determine the solid object detection performances and the indexes of the solid object detection performances are compared and the indexes of the solid object detection performances are smaller than the predetermined threshold set in advance. For example, when the operated indexes of the solid object detection performances are larger than the predetermined threshold for solid object detection performance evaluation set in advance, it is determined that the solid object detection performances are not degraded. Meanwhile, when the operated indexes of the solid object detection performances are smaller than the predetermined threshold for the solid object detection performance evaluation set in advance, it is determined that the solid object detection performances of the image recognition devices 80-1 to 80-4 are degraded.

In S80, when it is determined that the road surface information detection performances are not degraded, the process proceeds to S90. Meanwhile, when the operated indexes of the road surface information detection performances are smaller than the predetermined threshold for the road surface information detection performance evaluation set in advance, it is determined that the road surface information detection performances of the image recognition devices 80-1 to 80-4 are degraded and the process proceeds to S110.

In S110, information showing that the road surface information detection performances of the image recognition devices 80-1 to 80-4 are degraded is displayed on the display device or is reported to the driver by the alarm. In addition, because the drive control using the detection results of the road surface information of the image recognition devices 80-1 to 80-4 may not be continuously performed according to the degradations of the road surface information detection performances of the image recognition devices 80-1 to 80-4, the drive control using the road surface information is cancelled (S110).

Specifically, in the case in which the drive control is executed by recognizing a lane marker existing in front of the own vehicle 100 and executing steering control and acceleration/deceleration control not to deviate from a lane and detecting a distance with a moving object existing in front of the own vehicle 100 and executing the steering control and the acceleration/deceleration control, when it is determined that the road surface information detection performances of the image recognition devices 80-1 to 80-4 are degraded, it is determined that the detection performances of the lane marker by the image recognition devices 80-1 to 80-4 are also degraded and information showing that it is difficult to continuously execute a drive control mode in which the lane marker is recognized and the steering control and the acceleration/deceleration control are executed not to deviate from the lane is reported. Then, a change of a control mode to cancel the drive control mode in which the lane marker is recognized and the steering control and the acceleration/deceleration control are executed not to deviate from the lane is performed.

Meanwhile, in S80, when it is determined that the road surface information detection performances are not degraded, it is determined that the detection performances of the lane marker by the image recognition devices 80-1 to 80-4 are not degraded and the drive control mode in which the lane marker is recognized and the vehicle drives is continuously executed.

Next, in S80, when it is determined that the road surface information detection performances are not degraded, the process proceeds to step S90 and the solid object detection performances are determined. In S90, it is determined whether a predetermined threshold set in advance to determine the solid object detection performances and the indexes of the solid object detection performances are compared and the indexes of the solid object detection performances are smaller than the predetermined threshold set in advance. Here, when it is determined that the solid object detection performances of the image recognition devices 80-1 to 80-4 are degraded, the process proceeds to S100. In S100, information showing that the solid object information detection performances of the image recognition devices 80-1 to 80-4 are degraded is displayed on the display device 120 or is reported to the driver by the alarm. In addition, because the drive control using the detection results of the solid object information of the image recognition devices 80-1 to 80-4 may not be continuously performed according to the degradation of the solid object information detection performances of the image recognition devices 80-1 to 80-4, the drive control using the solid object information is cancelled (S100). Specifically, in the case in which the drive control is executed by recognizing a lane marker existing in front of the own vehicle 100 and executing steering control and acceleration/deceleration control not to deviate from a lane and detecting a distance with a moving object existing in a travelling direction of the own vehicle 100 and executing the steering control and the acceleration/deceleration control, when it is determined that the solid object information detection performances of the image recognition devices 80-1 to 80-4 are degraded, it is determined that detection performances of the image recognition devices 80-1 to 80-4 for an oncoming vehicle, a moving object, and an obstacle existing in the travelling direction of the own vehicle 100 are also degraded and information showing that it is difficult to continuously execute a drive control mode in which a distance with the moving object or the obstacle existing in the travelling direction of the own vehicle 100 is detected and steering control and acceleration/deceleration control to avoid a collision are executed is reported. Then, a change of a control mode to cancel the drive control mode in which the distance with the moving object or the obstacle existing in the travelling direction of the own vehicle 100 is detected and the steering control and the acceleration/deceleration control to avoid the collision are executed is performed.

Meanwhile, in S90, when it is determined that the solid object information detection performances are not degraded, it is determined that the solid object detection performances of the image recognition devices 80-1 to 80-4 are not degraded and the drive control mode in which the distance with the moving object or the obstacle existing in the travelling direction of the own vehicle 100 is detected using the image recognition devices 80-1 to 80-4 and the steering control and the acceleration/deceleration control to avoid the collision are executed is continuously executed.

In FIG. 9, determination of the first similarity degrees and the detection performances for the road surface detection is first performed (S80) and determination of the second similarity degrees and the detection performances for the solid objects is then performed (S90). However, determination of the second similarity degrees and the detection performances for the solid objects may be first performed and the determination of the first similarity degrees and the detection performances for the road surface detection may be then performed.

Figure 10:
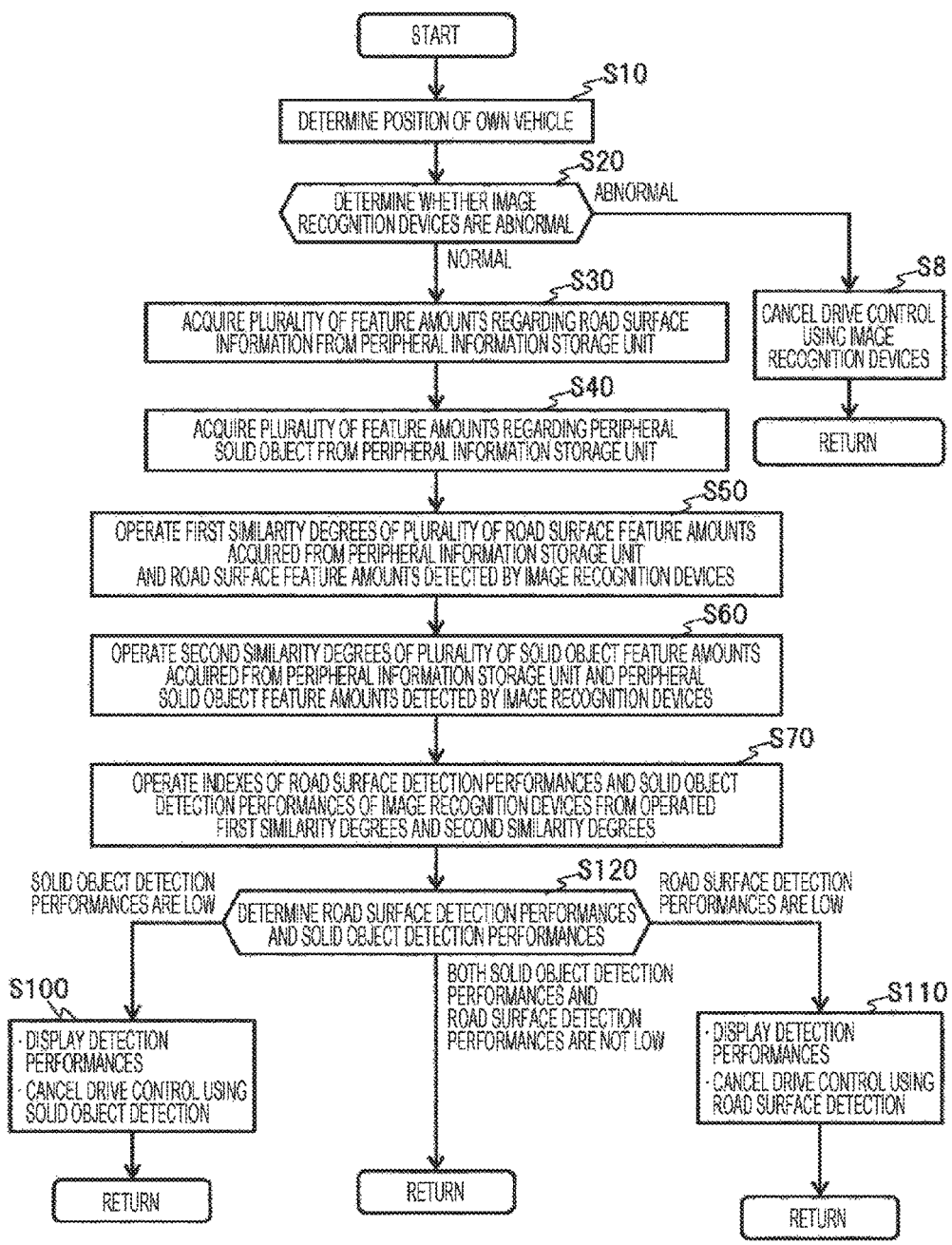
FIG. 10 is a diagram illustrating a flowchart of another embodiment of drive control according to this embodiment.

As illustrated in FIG. 10, determination of the first similarity degrees and the detection performances for the road surface detection and determination of the second similarity degrees and the detection performances for the solid objects are performed (S120). Here, when it is determined that the detection performances of the road surface detection are low, the process proceeds to S110. As described in FIG. 9, information showing that the road surface information detection performances of the image recognition devices 80-1 to 80-4 are degraded is displayed on the display device and is reported to the driver by the alarm.

Because the drive control using the detection results of the road surface information of the image recognition devices 80-1 to 80-4 may not be continuously executed according to the degradations of the road surface information detection performances of the image recognition devices 80-1 to 80-4, the drive control using the road surface information is cancelled. In S120, when it is determined that the solid object detection performances of the image recognition devices 80-1 to 80-4 are degraded, the process proceeds to S100. As described in FIG. 9, information showing that the solid object information detection performances of the image recognition devices 80-1 to 80-4 are degraded is displayed on the display device 120 or is reported to the driver by the alarm.

In addition, because the drive control using the detection results of the solid object information of the image recognition devices 80-1 to 80-4 may not be continuously performed according to the degradations of the solid object information detection performances of the image recognition devices 80-1 to 80-4, the drive control using the solid object information is cancelled. Meanwhile, in S120, when it is determined that both the road surface information detection performances and the solid object information detection performances are not degraded, it is determined that the solid object detection performances of the image recognition devices 80-1 to 80-4 are not degraded and the drive control mode in which the distance with the moving object or the obstacle existing in the travelling direction of the own vehicle 100 is detected using the image recognition devices 80-1 to 80-4 and the steering control and the acceleration/deceleration control to avoid the collision are executed is continuously executed.

Figure 11:
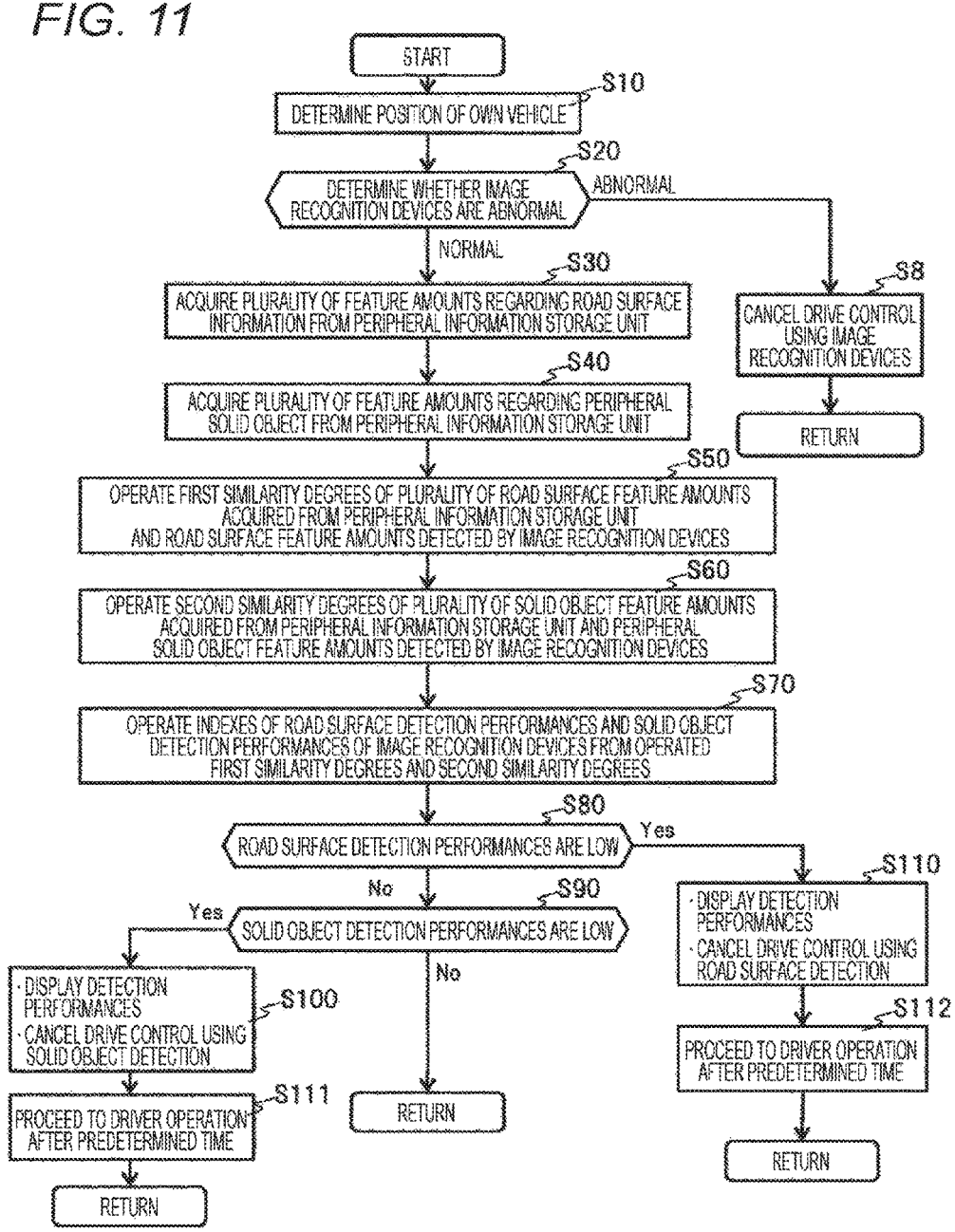
FIG. 11 is a diagram illustrating a flowchart of another embodiment of drive control according to this embodiment.

FIG. 11 is a diagram of another embodiment illustrating an outline of a flow when the similarity degrees and the detection performances are operated using the image recognition devices 80-1 to 80-4 and the peripheral environment storage unit 62 and the drive control is changed according to results thereof, in this embodiment.

In a part of FIG. 11, the same processing as FIGS. 8 and 9 is executed. In FIG. 11, S10 to S90 are the same as those in the flow illustrated in FIG. 9. A difference with FIG. 9 is a processing flow of S111 and S112. Similar to FIG. 9, in FIG. 11, when it is determined in S80 that the road surface information detection performances are not degraded, the process proceeds to S90. Meanwhile, when the operated indexes of the road surface information detection performances are smaller than the predetermined threshold for the road surface information detection performance evaluation set in advance, it is determined that the road surface information detection performances of the image recognition devices 80-1 to 80-4 are degraded and the process proceeds to S110.

In S110, information showing that the road surface information detection performances of the image recognition devices 80-1 to 80-4 are degraded is displayed on the display device or is reported to the driver by the alarm. Because the drive control using the detection results of the road surface information of the image recognition devices 80-1 to 80-4 may not be continuously executed according to the degradations of the road surface information detection performances of the image recognition devices 80-1 to 80-4, the drive control using the road surface information is cancelled (S110).

Next, the process proceeds to S112. After the drive control using the road surface information is cancelled, a change to an operation by the driver is reported and both driving-assisting drive control and self-driving control are cancelled after predetermined time. Specifically, in the case in which the drive control is executed by recognizing the lane marker existing in front of the own vehicle 100 and executing the steering control and acceleration/deceleration control not to deviate from the lane and detecting the distance with a moving object existing in front of the own vehicle 100 and executing the steering control and the acceleration/deceleration control, when it is determined that the road surface information detection performances of the image recognition devices 80-1 to 80-4 are degraded, it is determined that the detection performances of the lane marker by the image recognition devices 80-1 to 80-4 are also degraded and information showing that it is difficult to continuously execute a drive control mode in which the lane marker is recognized and the steering control and the acceleration/deceleration control are executed not to deviate from the lane is reported. Then, a change of a control mode to cancel the drive control mode in which the lane marker is recognized and the steering control and the acceleration/deceleration control are executed not to deviate from the lane is performed.

In addition, the overall detection performance of the image recognition devices 80-4 to 80-4 may be degraded. For this reason, after a change to the control mode to cancel the drive control mode in which the lane marker is recognized and the steering control and the acceleration/deceleration control are executed not to deviate from the lane, information showing that all of the operations are changed to the driver operation is reported and the driving-assisting drive control and the self-driving drive control to perform the steering control and the acceleration/deceleration control are cancelled after the predetermined time passes. As a result, the operations can be changed to the driver operation the predetermined time after the degradations of the detection performances of a part of the image recognition devices 80-1 to 80-4 are determined and the driver can proceed to the driver operation with sufficient spare time.

Next, in S90, it is determined whether the predetermined threshold set in advance to determine the solid object detection performances and the indexes of the solid object detection performances are compared and the solid object detection performances of the image recognition devices 80-1 to 80-4 are determined. When it is determined that the solid object detection performances are degraded, the process proceeds to S100. In S100, information showing that the solid object information detection performances of the image recognition devices 80-1 to 80-4 are degraded is displayed on the display device or is reported to the driver by the alarm. In addition, because the drive control using the detection results of the solid object information of the image recognition devices 80-1 to 80-4 may not be continuously performed according to the degradations of the solid object information detection performances of the image recognition devices 80-1 to 80-4, the drive control using the solid object information is cancelled (S100).

Next, the process proceeds to S111. After the drive control using the solid object information is cancelled, a change to the operation by the driver is reported and both the driving-assisting drive control and the self-driving control are cancelled after predetermined time. Specifically, in the case in which the drive control is executed by recognizing the lane marker existing in front of the own vehicle 100 and executing the steering control and acceleration/deceleration control not to deviate from the lane and detecting the distance with a moving object existing in front of the own vehicle 100 and executing the steering control and the acceleration/deceleration control, when it is determined that the solid object information detection performances of the image recognition devices 80-1 to 80-4 are degraded, it is determined that detection performances of the image recognition devices 80-1 to 80-4 for the oncoming vehicle, the moving object, and the obstacle existing in the travelling direction of the own vehicle 100 are also degraded and information showing that it is difficult to continuously execute the drive control mode in which the distance with the moving object or the obstacle existing in the travelling direction of the own vehicle 100 is detected and the steering control and acceleration/deceleration control to avoid the collision are executed is reported. Then, a change of a control mode to cancel the drive control mode in which the distance with the moving object or the obstacle existing in the travelling direction of the own vehicle 100 is detected and the steering control and the acceleration/deceleration control to avoid the collision are executed is performed. In addition, the overall detection performance of the image recognition devices 80-4 to 80-4 may be degraded. For this reason, after the change to the control mode to cancel the drive control mode in which the distance with the moving object or the obstacle existing in the travelling direction of the own vehicle 100 is detected and the steering control and the acceleration/deceleration control to avoid the collision are executed, information showing that all of the operations are changed to the driver operation is reported and the driving-assisting drive control and the self-driving drive control to perform the steering control and the acceleration/deceleration control are cancelled after the predetermined time passes.

As a result, the operations can be changed to the driver operation the predetermined time after the degradations of the detection performances of a part of the image recognition devices 80-1 to 80-4 are determined and the driver can proceed to the driver operation with sufficient spare time.

Figure 12:
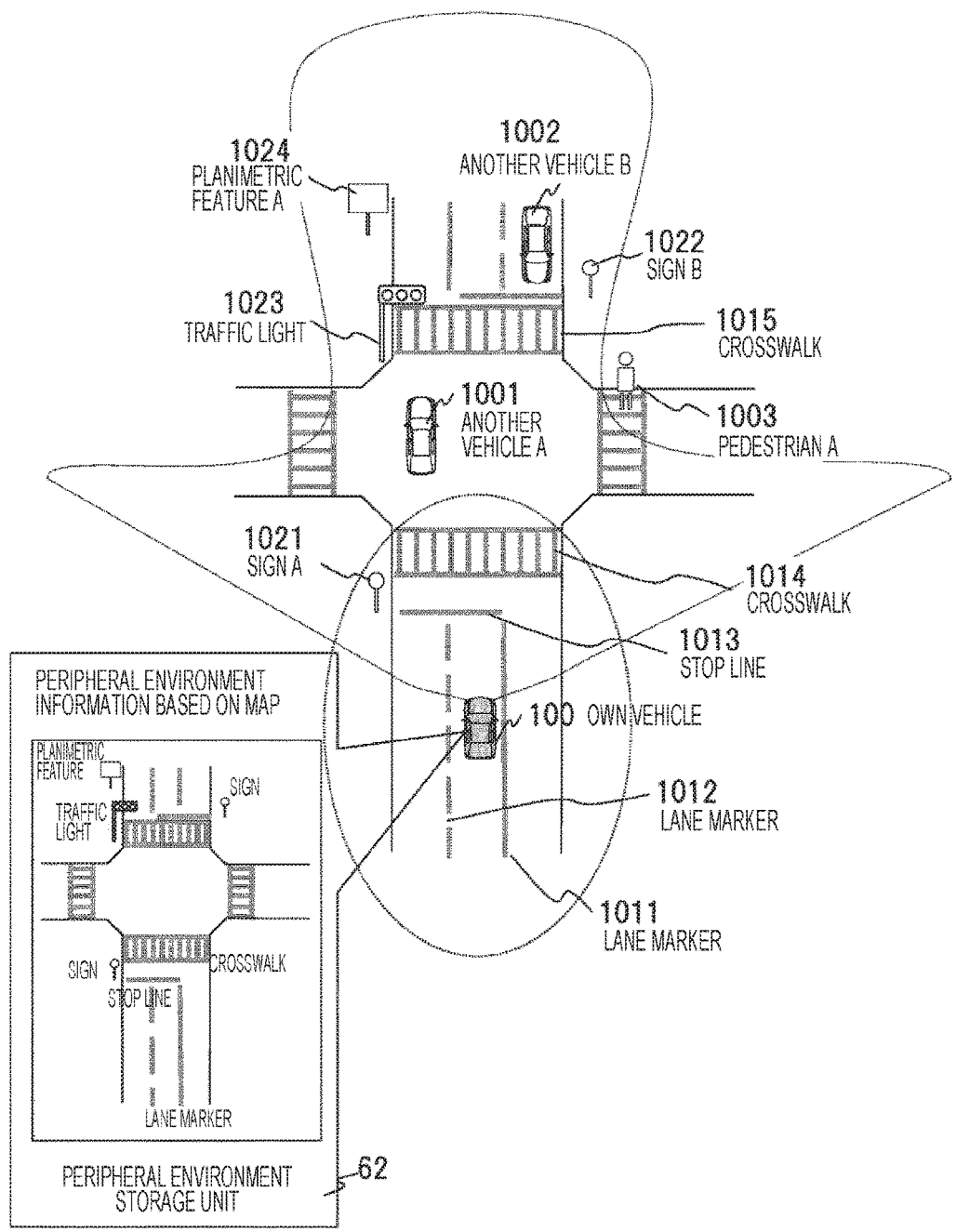
FIG. 12 is a diagram illustrating the case in which a map held by an own vehicle and information of a peripheral environment are stored in a peripheral environment storage unit of the own vehicle, as an embodiment in a drive scene for a drive control system according to this embodiment.

FIG. 12 is a diagram illustrating the case in which a map held by the own vehicle 100 and information of a peripheral environment are stored in the peripheral environment storage unit 62 of the own vehicle 100, as an embodiment in a drive scene for a drive control system according to this embodiment.

FIG. 12 illustrates a drive scene in which the own vehicle 100 drives in the vicinity of an intersection. There are lane markers 1011 and 1012 existing at both sides of a lane on which the own vehicle 100 drives, a stop line 1013 existing at a front side of a travelling direction of the own vehicle 100, and crosswalks 1014 and 1015 existing at the front side of the travelling direction of the own vehicle 100 as road surface information of peripheral environment information of the own vehicle 100.

In addition, there are a sign A 1021, a sign B 1022, a traffic light 1023, and a planimetric feature A 1024 existing at sides of the road on which the own vehicle 100 drives as solid object information of the peripheral environment information of the own vehicle 100. In addition, there are another vehicle A 1001, another vehicle B 1002, and a pedestrian 1003 as other moving objects.

The moving objects around the own vehicle change every hour. However, it can be generally thought that the moving objects exist at all time unless road surface paints or signs and traffic lights around the road do not change. In addition, positions of the road surface paints or the signs and the traffic lights existing at all times are stored as information on the map in the peripheral environment storage unit 62. As a result, if a position of the own vehicle 100 is specified during drive of the own vehicle 100, the map information and the position of the own vehicle are linked, so that positions of the lane markers 1011 and 1012 existing at both sides of the lane on which the own vehicle 100 drives, the stop line 1013 existing at the front side of the travelling direction of the own vehicle 100, and the crosswalks 1014 and 1015 existing at the front side of the travelling direction of the own vehicle 100 can be acquired as the road surface information of the peripheral environment of the own vehicle 100 and information of positions, sizes, and heights of the sign A 1021, the sign B 1022, the traffic light 1023, and the planimetric feature A 1024 existing at the sides of the road on which the own vehicle 100 drives can be acquired as the solid object information of the peripheral environment of the own vehicle 100.

Meanwhile, in the embodiment of FIG. 12, the road surface information such as the lane markers 1011 and 1012 existing at both sides of the lane on which the own vehicle 100 drives, the stop line 1013 existing at the front side of the travelling direction of the own vehicle 100, and the crosswalks 1014 and 1015 existing at the front side of the travelling direction of the own vehicle 100 exists in an area that can be detected by the image recognition devices 80-1 to 80-4 mounted on the own vehicle 100. Therefore, in a state in which the detection performances of the image recognition devices 80-1 to 80-4 are not degraded, the road surface information can be detected and the first similarity degree can be acquired from the road surface information detected by the image recognition devices 80-1 to 80-4 and the road surface information stored in the peripheral environment storage unit 62.

In addition, the sign A 1021, the sign B 1022, the traffic light 1023, and the planimetric feature A 1024 existing at the sides of the road on which the own vehicle 100 drives, which are the solid object information of the peripheral environment information of the own vehicle 100, exist in an area that can be detected by the image recognition devices 80-1 to 80-4 mounted on the own vehicle 100. Therefore, in a state in which the detection performances of the image recognition devices 80-1 to 80-4 are not degraded, the solid object information can be detected and the second similarity degree can be acquired from the solid object information detected by the image recognition devices 80-1 to 80-4 and the solid object information stored in the peripheral environment storage unit 62.

FIG. 13 is a diagram illustrating the peripheral environment information stored in the peripheral environment storage unit 62 according to this embodiment. As illustrated in FIG. 13, at least two kinds of information including the road surface information and the solid object information exist in FIG. 13 as the information stored in the peripheral environment storage unit 62.

The road surface information is information stored in the road surface feature amount storage unit 621. For example, as illustrated in FIG. 13, there are a lane marker, a stop line, a road surface paint, and a crosswalk as types of the road surface information. The road surface information is represented by coordinates representing which position on the map the road surface paint exists at. In addition, according to a type of the road surface paint, the size of the paint is stored as information.

As a result, if the position of the own vehicle 100 on the map is specified, it can be seen which position there is the road surface paint at from the position of the own vehicle 100. In addition, the solid object information is information stored in the solid object feature amount storage unit 622. For example, as illustrated in FIG. 13, there are a sign, an advertising display, a traffic light, and other solid planimetric feature as types of the solid object information. The solid object information is represented by coordinates representing which position on the map the solid object existing around the road exists at. In addition, parameters representing sizes of the solid objects such as heights and widths of the solid objects are stored as information. As a result, if the position of the own vehicle 100 on the map is specified, it can be seen what kind of solid object there is at which position from the position of the own vehicle 100.

Figure 14:
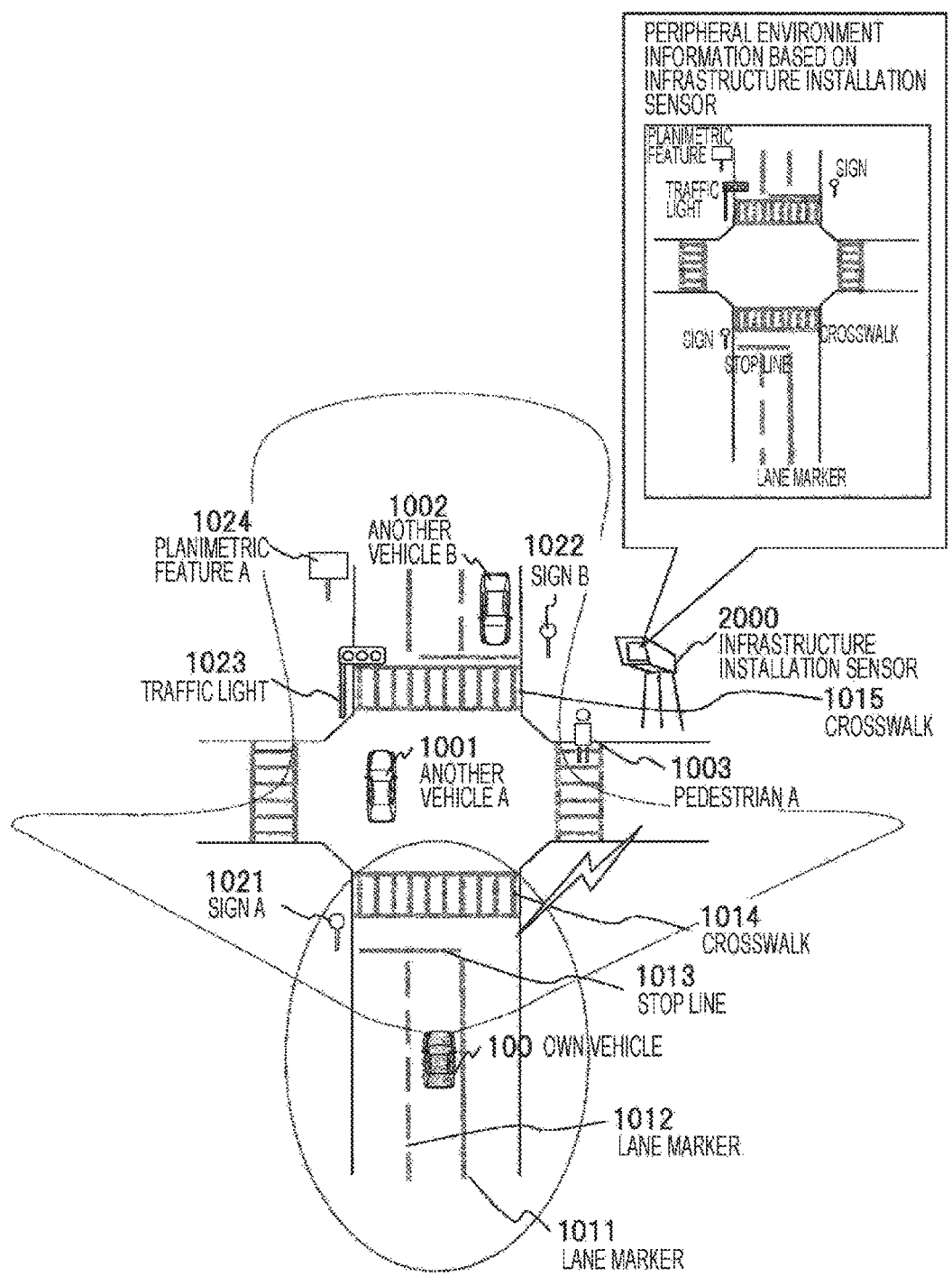
FIG. 14 is a diagram illustrating the case in which information of sensors installed on an infrastructure such as a road and a map held by an own vehicle are stored in a peripheral environment storage unit of the own vehicle, as an embodiment in a drive scene for a drive control system according to this embodiment.

FIG. 14 is a diagram illustrating the case in which information of sensors installed on an infrastructure such as a road and a map held by the own vehicle are stored in the peripheral environment storage unit 62 of the own vehicle 100, as an embodiment in a drive scene for a drive control system according to this embodiment.

Similar to FIG. 12, FIG. 14 illustrates a drive scene in which the own vehicle 100 drives in the vicinity of an intersection. There are lane markers 1011 and 1012 existing at both sides of a lane on which the own vehicle 100 drives, a stop line 1013 existing at a front side of a travelling direction of the own vehicle 100, and crosswalks 1014 and 1015 existing at the front side of the travelling direction of the own vehicle 100 as road surface information of peripheral environment information of the own vehicle 100.

In addition, there are a sign A 1021, a sign B 1022, a traffic light 1023, and a planimetric feature A 1024 existing at sides of the road on which the own vehicle 100 drives as solid object information of the peripheral environment information of the own vehicle 100. In addition, there are another vehicle A 1001, another vehicle B 1002, and a pedestrian 1003 as other moving objects.

The moving objects around the own vehicle change every hour. However, it can be generally thought that the moving objects exist at all time unless road surface paints or signs and traffic lights around the road do not change. At the intersection, an infrastructure installation sensor 2000 may be provided in the vicinity of the road to provide monitoring information of a traffic situation or traffic information in the vicinity of the intersection to each vehicle entering the intersection so as to assist driving. The image recognition device may be applied as an example of the infrastructure installation sensor 2000 and a peripheral environment of the road may be recognized by the image recognition device of the infrastructure installation sensor 2000. The infrastructure installation sensor 2000 may detect the traffic situation by a plurality of sensors such as infrared cameras to grasp the traffic situation under an adverse environment. The own vehicle 100 acquires information regarding a moving object, a solid object, and a road surface around the road detected by the infrastructure installation sensor 2000, using the communication device, so that the peripheral environment information stored in the peripheral environment storage unit 62 of the own vehicle 100 can be updated with latest information.

As a result, the road surface information or the solid object information stored in the peripheral environment storage unit 62 is updated with the current latest information, so that reliability of the determination results of the detection performances of the image recognition devices 80-1 to 80-4 can be increased. In addition, in the infrastructure installation sensor 2000, a moving object existing only at the present time can be detected and determination of detection performance of a moving solid object can be performed by comparing a detection result of the moving object existing only at the present time and information regarding the moving object detected by the image recognition devices 80-1 to 80-4 of the own vehicle 100. In the above example, the case in which the image recognition device is used as the infrastructure installation sensor 2000 has been described. However, information of the solid object or the paint existing around the road may be acquired using scanning radar.

As such, the information detected by the infrastructure installation sensor 2000 can be acquired by the own vehicle 100 using the communication device and positions of the road surface paint, the sign, and the traffic light can be stored as the information on the map in the peripheral environment storage unit 62. As a result, similar to the case described in FIG. 12, if a position of the own vehicle 100 is specified during drive of the own vehicle 100, the map information and the position of the own vehicle are linked, so that positions of the lane markers 1011 and 1012 existing at both sides of the lane on which the own vehicle 100 drives, the stop line 1013 existing at the front side of the travelling direction of the own vehicle 100, and the crosswalks 1014 and 1015 existing at the front side of the travelling direction of the own vehicle 100 can be acquired as the road surface information of the peripheral environment of the own vehicle 100 and information of positions, sizes, and heights of the sign A 1021, the sign B 1022, the traffic light 1023, and the planimetric feature A 1024 existing at the sides of the road on which the own vehicle 100 drives can be acquired as the solid object information of the peripheral environment of the own vehicle 100.

In addition, the road surface information such as the lane markers 1011 and 1012 existing at both sides of the lane on which the own vehicle 100 drives, the stop line 1013 existing at the front side of the travelling direction of the own vehicle 100, and the crosswalks 1014 and 1015 existing at the front side of the travelling direction of the own vehicle 100 can be detected by the image recognition devices 80-1 to 80-4 mounted on the own vehicle 100 and the first similarity degree can be acquired from the road surface information detected by the image recognition devices 80-1 to 80-4 and the road surface information stored in the peripheral environment storage unit 62. The solid object information such as the sign A 1021, the sign B 1022, the traffic light 1023, and the planimetric feature A 1024 existing at the sides of the road on which the own vehicle 100 drives can be detected by the image recognition devices 80-1 to 80-4 mounted on the own vehicle 100 and the second similarity degree can be acquired from the solid object information detected by the image recognition devices 80-1 to 80-4 and the solid object information stored in the peripheral environment storage unit 62.

Figure 15:
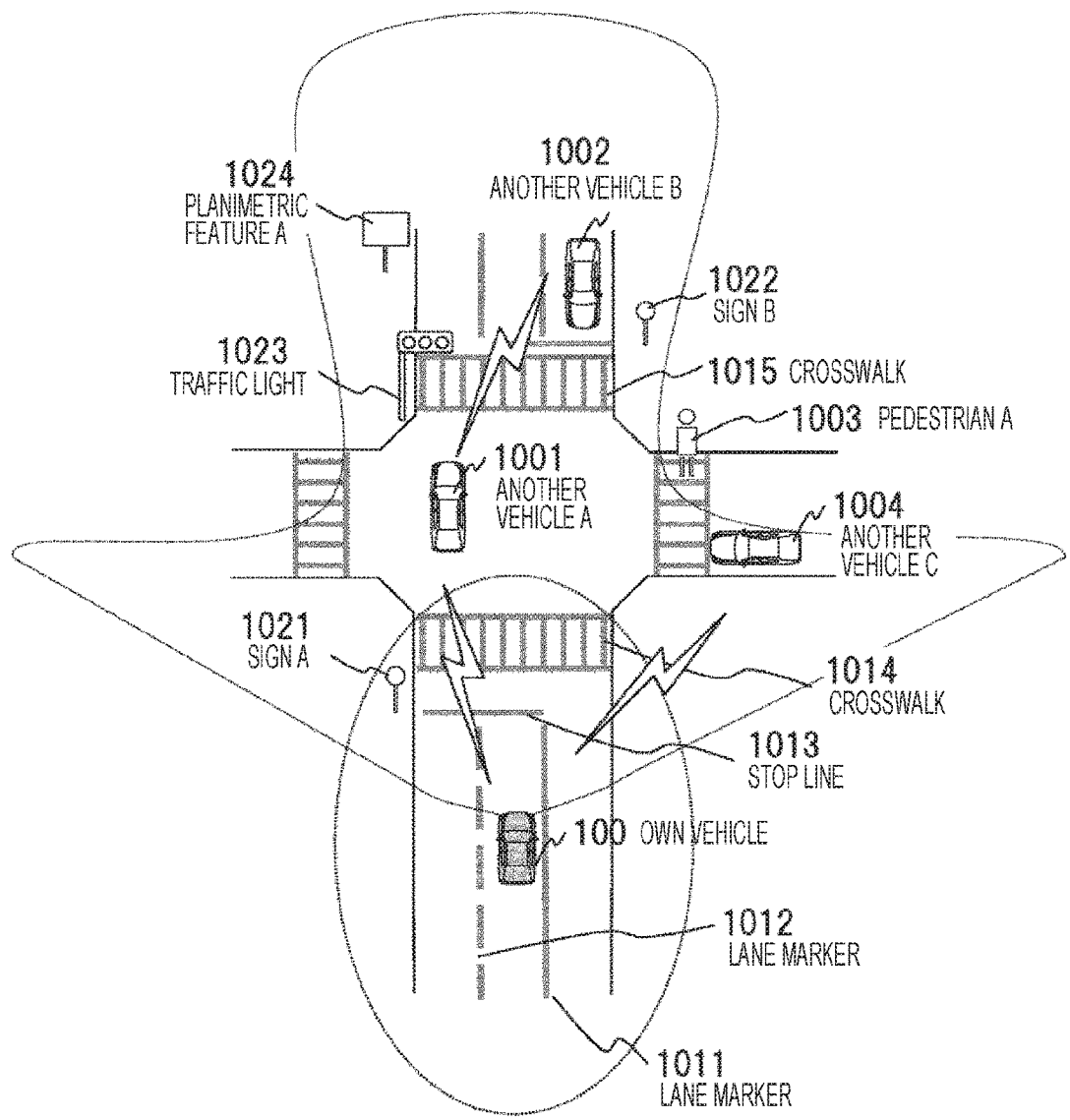
FIG. 15 is a diagram illustrating the case in which information detected by another vehicle and a map held by an own vehicle are stored in a peripheral environment storage unit of the own vehicle, as an embodiment in a drive scene for a drive control system according to this embodiment.

FIG. 15 is a diagram illustrating the case in which information detected by another vehicle and a map held by the own vehicle 100 are stored in the peripheral environment storage unit 62 of the own vehicle 100, as an embodiment in a drive scene for a drive control system according to this embodiment.

Similar to FIGS. 12 and 14, FIG. 15 illustrates a drive scene in which the own vehicle 100 drives in the vicinity of an intersection. There are lane markers 1011 and 1012 existing at both sides of a lane on which the own vehicle 100 drives, a stop line 1013 existing at a front side of a travelling direction of the own vehicle 100, and crosswalks 1014 and 1015 existing at the front side of the travelling direction of the own vehicle 100 as road surface information of peripheral environment information of the own vehicle 100.

In addition, there are a sign A 1021, a sign B 1022, a traffic light 1023, and a planimetric feature A 1024 existing at sides of the road on which the own vehicle 100 drives as solid object information of the peripheral environment information of the own vehicle 100. In addition, there are another vehicle A 1001, another vehicle B 1002, another vehicle C 1004, and a pedestrian 1003 as other moving objects. The moving objects around the own vehicle change every hour. However, it can be generally thought that the moving objects exist at all time unless road surface paints or signs and traffic lights around the road do not change.

In the drive scene, an in-vehicle sensor is mounted on each of another vehicle A 1001, another vehicle B 1002, and another vehicle C 1004 to detect peripheral information of each vehicle and information of each vehicle may be communicated to another vehicle or a data center using the communication device. When there is another vehicle having the sensor to detect the peripheral environment and the communication device, another vehicle A 1001 has road surface information (a stop line position, a lane marker position, and a crosswalk position) and solid object information (positions of the signs A and B, a position of the traffic light A, and a position of the planimetric feature A) detected by the in-vehicle sensor and information of positions of moving objects other than the own vehicle (another vehicle A 1001) and a position of the own vehicle (another vehicle A 1001) and the own vehicle 100 can acquire the information of another vehicle A 1001 by communication.

As a result, it is possible to acquire the peripheral information not to be the information detected by the image recognition units 80-1 to 80-4 of the own vehicle 100. The peripheral information is stored in the peripheral information storage unit 62 of the own vehicle 100, so that the peripheral environment information stored in the peripheral environment storage unit 62 of the own vehicle 100 can be updated with latest information. That is, the road surface information or the solid object information stored in the peripheral environment storage unit 62 is updated with the current latest information, so that reliability of the determination results of the detection performances of the image recognition devices 80-1 to 80-4 can be increased.

In addition, information is acquired from another vehicle B 1002 and another vehicle C 1004 other than another vehicle A 1001 in the same way, so that the road surface information or the solid object information stored in the peripheral environment storage unit 62 of the own vehicle 100 can be updated over a wide range. In addition, another vehicle A 1001, another vehicle B 1002, and another vehicle C 1004 can detect a moving object existing only at the present time and determination of detection performance of a moving solid object can be performed by comparing a detection result of the moving object existing only at the present time and information regarding the moving object detected by the image recognition devices 80-1 to 80-4 of the own vehicle 100. In addition, the position of each of another vehicle A 1001, another vehicle B 1002, and another vehicle C 1004 can be acquired and determination of the detection performances of the vehicles can be performed by comparing the positions of the individual vehicles and the information regarding the moving objects detected by the image recognition devices 80-1 to 80-4 of the own vehicle 100.

As such, the peripheral information detected by another vehicle can be acquired by the own vehicle 100 using the communication device and positions of the road surface paint, the sign, and the traffic light and the position of the moving object can be stored as the information on the map in the peripheral environment storage unit 62. As a result, similar to the cases described in FIGS. 12 and 14, if the position of the own vehicle 100 is specified during drive of the own vehicle 100, the map information and the position of the own vehicle are linked, so that positions of the lane markers 1011 and 1012 existing at both sides of the lane on which the own vehicle 100 drives, the stop line 1013 existing at the front side of the travelling direction of the own vehicle 100, and the crosswalks 1014 and 1015 existing at the front side of the travelling direction of the own vehicle 100 can be acquired as the road surface information of the peripheral environment of the own vehicle 100 and information of positions, sizes, and heights of the sign A 1021, the sign B 1022, the traffic light 1023, and the planimetric feature A 1024 existing at the sides of the road on which the own vehicle 100 drives can be acquired as the solid object information of the peripheral environment of the own vehicle 100.

In addition, the road surface information such as the lane markers 1011 and 1012 existing at both sides of the lane on which the own vehicle 100 drives, the stop line 1013 existing at the front side of the travelling direction of the own vehicle 100, and the crosswalks 1014 and 1015 existing at the front side of the travelling direction of the own vehicle 100 can be detected by the image recognition devices 80-1 to 80-4 mounted on the own vehicle 100 and the first similarity degree can be acquired from the road surface information detected by the image recognition devices 80-1 to 80-4 and the road surface information stored in the peripheral environment storage unit 62. The solid object information such as the sign A 1021, the sign B 1022, the traffic light 1023, and the planimetric feature A 1024 existing at the sides of the road on which the own vehicle 100 drives can be detected by the image recognition devices 80-1 to 80-4 mounted on the own vehicle 100 and the second similarity degree can be acquired from the solid object information detected by the image recognition devices 80-1 to 80-4 and the solid object information stored in the peripheral environment storage unit 62. Because the positions of another vehicle A 1001, another vehicle B 1002, and another vehicle C 1004 can be acquired, vehicle detection performances of the solid object detection performances of the image recognition devices 80-1 to 80-4 can be determined by comparing the acquired positions and the vehicle results detected by the image recognition devices 80-1 to 80-4.

Figure 16:
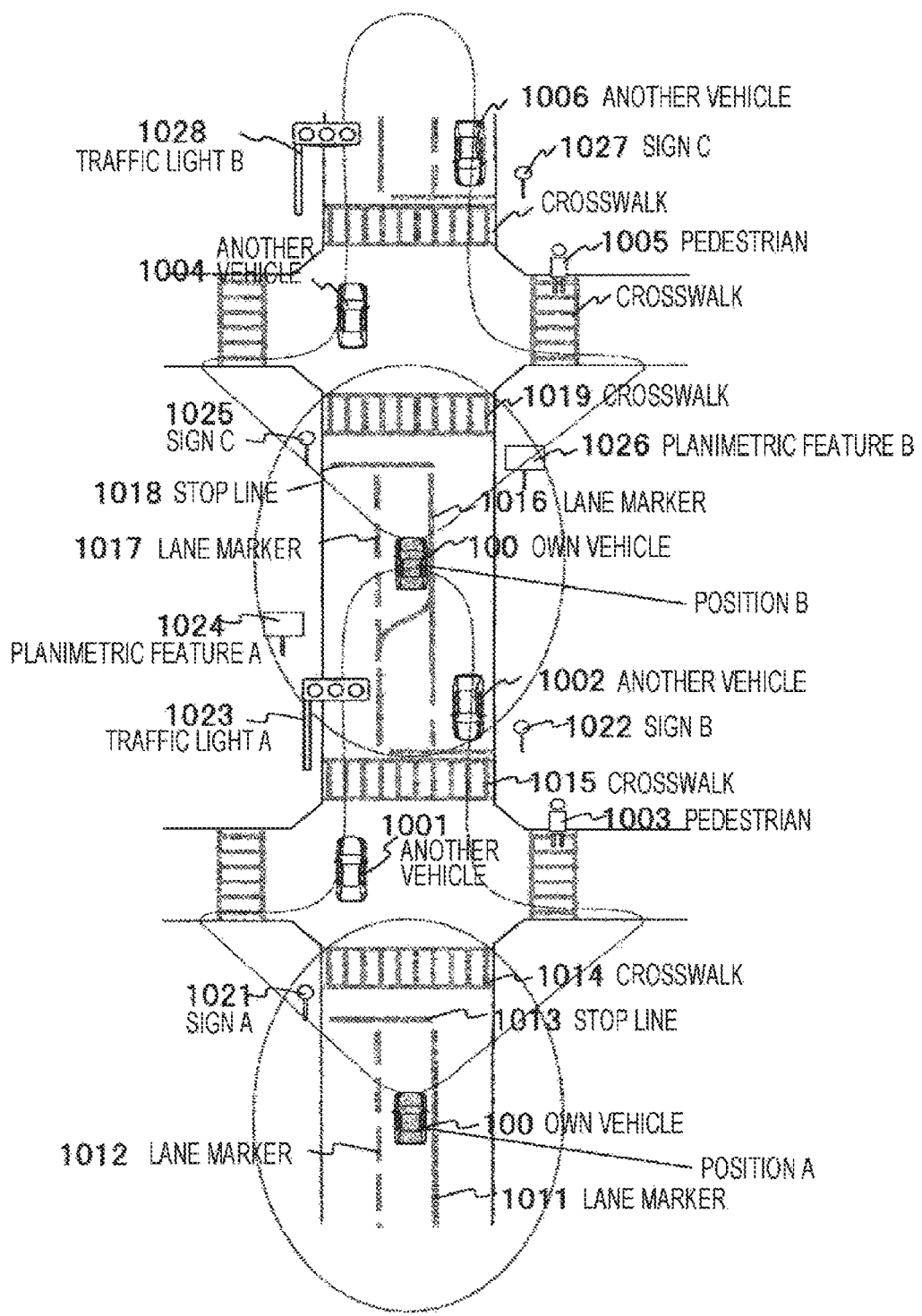
FIG. 16 is a diagram illustrating results detected by image recognition devices at a plurality of points during drive of an own vehicle and information stored in a peripheral environment storage unit of the own vehicle, as an embodiment in a drive scene for a drive control system according to this embodiment.

FIG. 16 is a diagram illustrating results detected by the image recognition devices 80-1 to 80-4 at a plurality of points during drive of the own vehicle 100 and information stored in the peripheral environment storage unit 62 of the own vehicle 100, as an embodiment in a drive scene for a drive control system according to this embodiment.

FIG. 16 illustrates a drive scene in which the own vehicle 100 drives straight on a straight road having a plurality of intersections. There are lane markers 1011, 1012, 1016, and 1017 existing at both sides of a lane on which the own vehicle 100 drives, stop lines 1013 and 1018 existing at a front side of a travelling direction of the own vehicle 100, and crosswalks 1014, 1015, and 1019 existing at the front side of the travelling direction of the own vehicle 100 as road surface information of peripheral environment information of the own vehicle 100.

In addition, there are a sign A 1021, a sign B 1022, a sign C 1025, a sign C 1027, a traffic light A 1023, a traffic light B 1028, a planimetric feature A 1024, and a planimetric feature B 1026 existing at sides of the road on which the own vehicle 100 drives as solid object information of the peripheral environment information of the own vehicle 100. In addition, there are another vehicle 1001, 1002, 1004, and 1006 and pedestrians 1003 and 1005 as other moving objects.

The moving objects change every hour. However, the moving objects exist at all time unless road surface paints or signs and traffic lights around the road do not change, as described above, and positions of the road surface paints or the signs and the traffic lights are stored as information on a map in the peripheral environment storage unit 62.

As a result, if a position of the own vehicle 100 is specified during drive of the own vehicle 100, the map information and the position of the own vehicle are linked, so that positions of the lane markers existing at both sides of the lane on which the own vehicle 100 drives, the stop lines, and the crosswalks can be acquired as the road surface information of the peripheral environment of the own vehicle 100 and information of positions, sizes, and heights of the signs, the traffic lights, and the planimetric features existing at the sides of the road on which the own vehicle 100 drives can be acquired as the solid object information of the peripheral environment of the own vehicle 100.

In an example of FIG. 16, the own vehicle 100 moves from a position A to a position B. At a point of the position A, the own vehicle 100 can detect the lane markers 1011 and 1012, the stop line 1013, and the crosswalks 1014 and 1015 as the road surface information of the peripheral environment of the own vehicle 100 by the image recognition devices 80-1 to 80-4 and can detect the position and the sizes of the sign A 1021, the sign B 1022, the traffic light A 1023, and the planimetric feature A 1024 as the solid object information of the peripheral environment of the own vehicle 100 by the image recognition devices 80-1 to 80-4.

In addition, the road surface information and the solid object information stored in the peripheral information storage unit 62 can be acquired at the point of the position A. Therefore, a similarity degree of the road surface information detected by the image recognition devices 80-1 to 80-4 at the position A and the road surface information stored in the peripheral environment storage unit 62 and a similarity degree of the solid object information detected by the image recognition devices 80-1 to 80-4 at the position A and the solid object information stored in the peripheral environment storage unit 62 can be stored.

Likewise, at the movement position B of the own vehicle 100, the own vehicle 100 can detect the lane markers 1016 and 1017, the stop line 1018, and the crosswalk 1019 as the road surface information of the peripheral environment of the own vehicle 100 by the image recognition devices 80-1 to 80-4 and can detect the position and the sizes of the sign C 1025, the sign D 1027, the traffic light B 1028, and the planimetric feature B 1026 as the solid object information of the peripheral environment of the own vehicle 100 by the image recognition devices 80-1 to 80-4.

In addition, the road surface information and the solid object information stored in the peripheral information storage unit 62 can be acquired at the point of the position B. Therefore, a similarity degree of the road surface information detected by the image recognition devices 80-1 to 80-4 at the position B and the road surface information stored in the peripheral environment storage unit 62 and a similarity degree of the solid object information detected by the image recognition devices 80-1 to 80-4 at the position B and the solid object information stored in the peripheral environment storage unit 62 can be stored. As such, similarity degrees regarding the road surface information and similarity degrees regarding the solid object information at a plurality of positions can be stored during the movement of the own vehicle 100 and a similarity degree regarding the current solid object or road surface can be finally acquired using information of the similarity degrees at the plurality of positions.

As such, the information of the similarity degrees at the plurality of positions is stored and the final similarity degree regarding the solid object or road surface is acquired. As a result, even when an amount of road surface information (the stop lines and the crosswalks) or solid object information (the signs and the traffic lights) available for determination at each position is small, an amount of data necessary for the determination can be increased by using road surface information (the stop lines and the crosswalks) or solid object information (the signs and the traffic lights) available at the plurality of positions and reliability of determination of the detection performance can be increased.

FIG. 17 is a diagram illustrating an embodiment of determining a similarity degree from the road surface information stored in the peripheral environment storage unit 62 and the road surface information detected by the image recognition devices 80-1 to 80-4, in the drive control system according to this embodiment.

As the road surface information stored in the peripheral environment storage unit 62, there is road surface paint information such as left and right lane markers, stop lines, and crosswalks, as illustrated in an example of FIG. 17. The information is changed according to a position of the own vehicle. If the own vehicle 100 detects road surface information around the own vehicle 100 by the image recognition devices 80-1 to 80-4 at a certain position, the road surface information is compared with the road surface information corresponding to a detection position and a type and stored in the peripheral environment storage unit 62.

For example, in an example of FIG. 17, when the image recognition devices 80-1 to 80-4 detect a right lane marker which is x[m] away in front of the own vehicle 100 and there is the same information as the road surface information stored in the peripheral environment storage unit 62, 1 is set as a similarity determination result. Likewise, when the image recognition devices 80-1 to 80-4 detect a left lane marker which is the x[m] away in front of the own vehicle 100 and there is the same information as the road surface information stored in the peripheral environment storage unit 62, 1 is set as a similarity determination result.

In addition, when there is a stop line A which is k[m] away in front of the own vehicle 100 as the road surface information stored in the peripheral environment storage unit 62, but the image recognition devices 80-1 to 80-4 cannot detect a stop line at the same position in front of the own vehicle 100, 0 is set as a similarity determination result.

In addition, when there is a crosswalk A which is L[m] away in front of the own vehicle 100 as the road surface information stored in the peripheral environment storage unit 62 and the image recognition devices 80-1 to 80-4 detect a crosswalk at the same position in front of the own vehicle 100, 1 is set as a similarity determination result. By the above method, a similarity determination result for the road surface information is acquired. As a method of acquiring a similarity degree from the result, a ratio of the total sum of similarity determination results to the total number of target objects on which the similarity determination has been performed can be set as the similarity degree.

That is, if the total number of target objects on which the similarity determination has been performed and the total sum of similarity determination results become equal to each other, the similarity degree becomes 1 and if the total sum of similarity determination results is 0, the similarity degree becomes 0. Here, as the target objects on which the similarity determination used to acquire the similarity degree has been performed, the predetermined total number of target objects including a latest detection result and previous detection results can be used. In addition, the target objects may be all target objects on which the similarity determination has been performed in past predetermined time from the present time. By acquiring the similarity degree using past similarity determination results, histories of changes of the detection performances of the image recognition devices 80-1 to 80-4 can be grasped and degradations of the detection performances can be determined.

FIG. 18 is a diagram illustrating an embodiment of determining a similarity degree from the solid object information stored in the peripheral environment storage unit 62 and the solid object information detected by the image recognition devices 80-1 to 80-4, in the drive control system according to this embodiment.

As the solid object information stored in the peripheral environment storage unit 62, there is solid object information around a road, such as traffic lights, signs, and solid objects, as illustrated in an example of FIG. 18. The information is changed according to a position of the own vehicle. If the own vehicle 100 detects the solid object information around the own vehicle 100 by the image recognition devices 80-1 to 80-4 at a certain position, the solid object information is compared with the solid object information corresponding to a detection position and a type and stored in the peripheral environment storage unit 62.

For example, in an example of FIG. 18, when the image recognition devices 80-1 to 80-4 detect a traffic light A which is x[m] away in front of the own vehicle 100 and there is information of the same traffic light as the solid object information stored in the peripheral environment storage unit 62, 1 is set as a similarity determination result. When the image recognition devices 80-1 to 80-4 detect a sign B which is y[m] away in front of the own vehicle 100 and there is information of the same sign as the solid object information stored in the peripheral environment storage unit 62, 1 is set as a similarity determination result.

In addition, when there is a sign A which is z[m] away in front of the own vehicle 100 as the solid object information stored in the peripheral environment storage unit 62, but the image recognition devices 80-1 to 80-4 cannot detect the sign A at the same position in front of the own vehicle 100, 0 is set as a similarity determination result.

As such, the individual solid object information stored in the peripheral environment storage unit 62 and the detection results by the image recognition devices 80-1 to 80-4 of the own vehicle 100 are compared and 0 or 1 is set as the similarity determination result. By the above method, a similarity determination result for the solid object information is acquired. As a method of acquiring a similarity degree from the result, a ratio of the total sum of similarity determination results to the total number of target objects on which the similarity determination has been performed can be set as the similarity degree. That is, if the total number of target objects on which the similarity determination has been performed and the total sum of similarity determination results become equal to each other, the similarity degree becomes 1 and if the total sum of similarity determination results is 0, the similarity degree becomes 0.

Here, as the target objects on which the similarity determination used to acquire the similarity degree has been performed, the predetermined total number of target objects including a latest detection result and previous detection results can be used. In addition, the target objects may be all target objects on which the similarity determination has been performed in past predetermined time from the present time. By acquiring the similarity degree using past similarity determination results, histories of changes of the detection performances of the image recognition devices 80-1 to 80-4 can be grasped and degradations of the detection performances can be determined.

A first similarity degree or a second similarity degree as a whole can be acquired by detecting the peripheral road surface or solid object by all of the image recognition devices 80-1 to 80-4. A change of detection performance of each of the image recognition devices 80-1 to 80-4 can be acquired by acquiring a similarity degree for each detectable area of the image recognition devices 80-1 to 80-4 and acquiring a first similarity degree and a second similarity degree of each of the image recognition devices.

Figure 19:
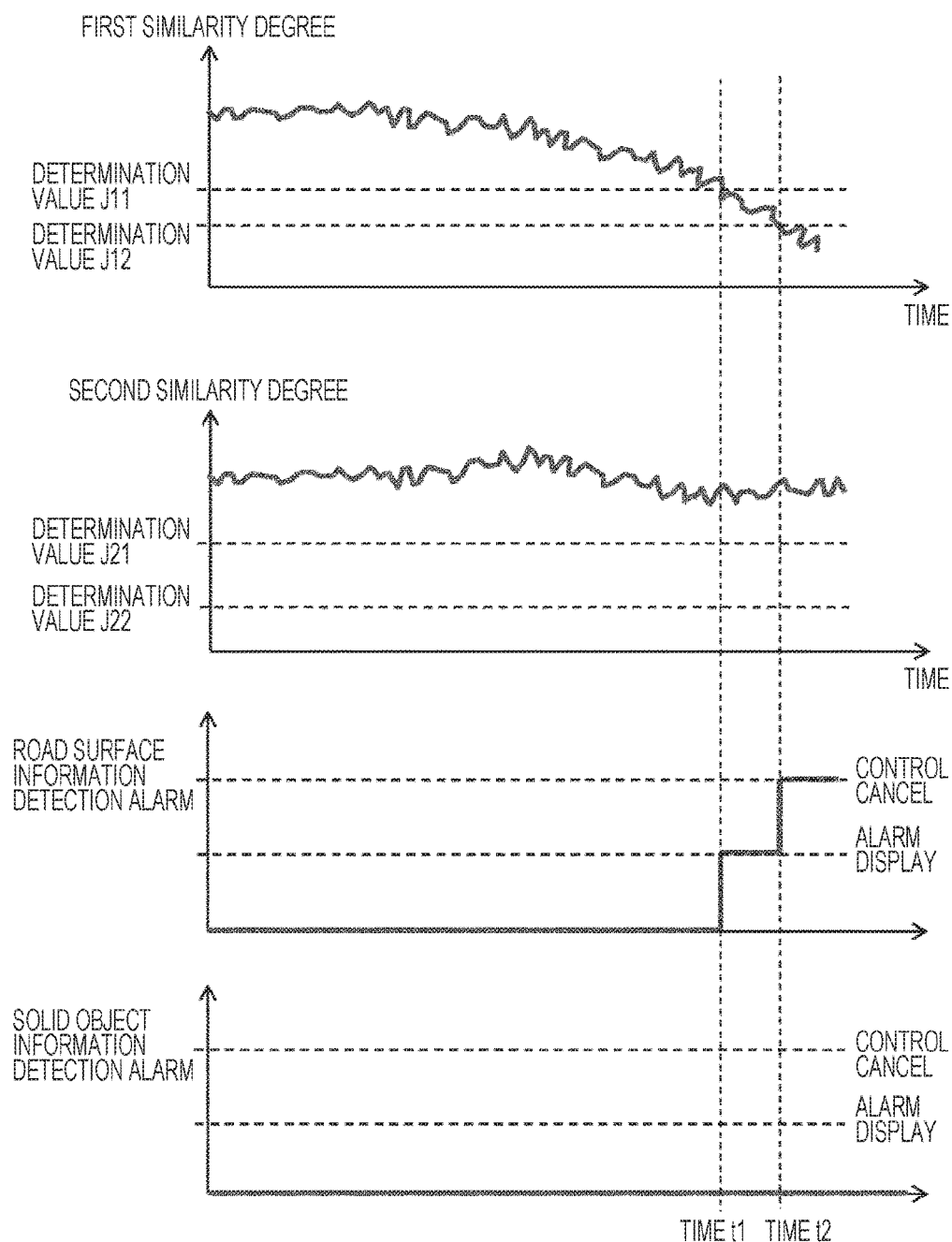
FIG. 19 is a diagram illustrating an embodiment of reporting performances of image recognition devices according to a first similarity degree and a second similarity degree, in a drive control system according to this embodiment.

FIG. 19 is a diagram illustrating an embodiment of reporting performances of the image recognition devices 80-1 to 80-4 according to a first similarity degree and a second similarity degree, in the drive control system according to this embodiment. FIG. 19 is an example illustrating time changes of the first similarity degree, the second similarity degree, a road surface information detection alarm, and a solid object information detection alarm from the top.

Determination values J11 and J12 and determination values J21 and J22 are set to the first similarity degree and the second similarity degree, respectively. For each of the road surface information detection alarm and the solid object information detection alarm, there are two modes including an alarm display mode in which information showing that road surface information detection or solid object information detection is degraded is displayed and a control cancel mode in which information showing that the road surface information detection or the solid object information detection is degraded and it is difficult to perform drive control using a road surface information detection result or a solid object information detection result is displayed.

FIG. 19 illustrates an example of the case in which the first similarity degree for the road surface information decreases. The first similarity degree decreases with time and is less than the determination value J11 at time t1. At the time t1 when the first similarity degree is less than the determination value J11, in the road surface information detection alarm, a mode becomes the alarm display mode and the information showing that the road surface information detection is degraded is displayed. In addition, the first similarity degree for the road surface information decreases continuously and is less than the determination value J12 at time t2. At the time t2 when the first similarity degree is less than the determination value J12, in the road surface information detection alarm, a mode becomes the control cancel mode and the information showing that the road surface information detection is degraded and it is difficult to continuously execute the drive control using the road surface information detection result is displayed. Actually, the drive control using the road surface information detection result is cancelled.

In this embodiment, the example of the road surface information detection alarm has been described. However, the solid object information detection alarm is also the same. In addition, the description has been given using the first similarity degree and the second similarity degree. However, even when an index of road surface detection performance operated from the first similarity degree or an index of solid object detection performance operated from the second similarity degree is used instead, the description is the same.

As such, determination and display of degradation of the detection performance are performed on the basis of the decrease of the similarity degree or the index of the detection performance and cancel of the drive control according to the degradation of the detection performance is performed after the determination and the display of the degradation of the detection performance are performed, so that control is not cancelled rapidly with respect to the driver. Therefore, the driver can previously correspond to the cancel of the control according to the degradation of the detection performance.

Figure 20A:
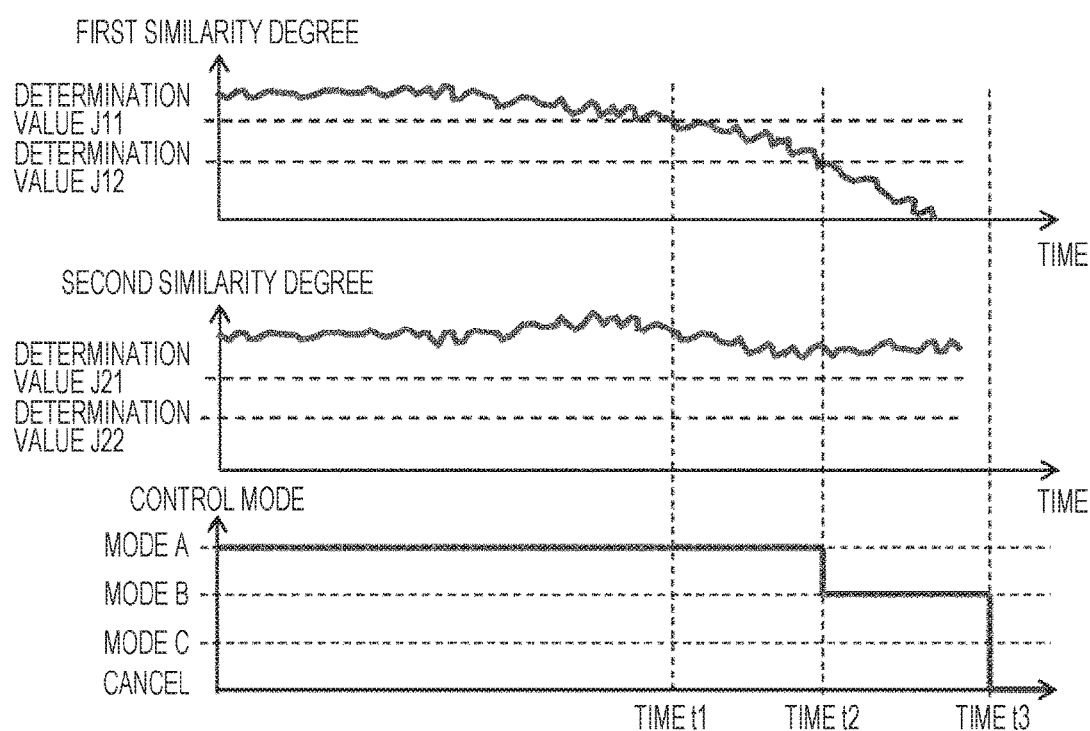
FIG. 20(A) FIG. 20A illustrates time changes of a first similarity degree, a second similarity degree, and a control mode executed by a drive control device 60.
Figure 20B:
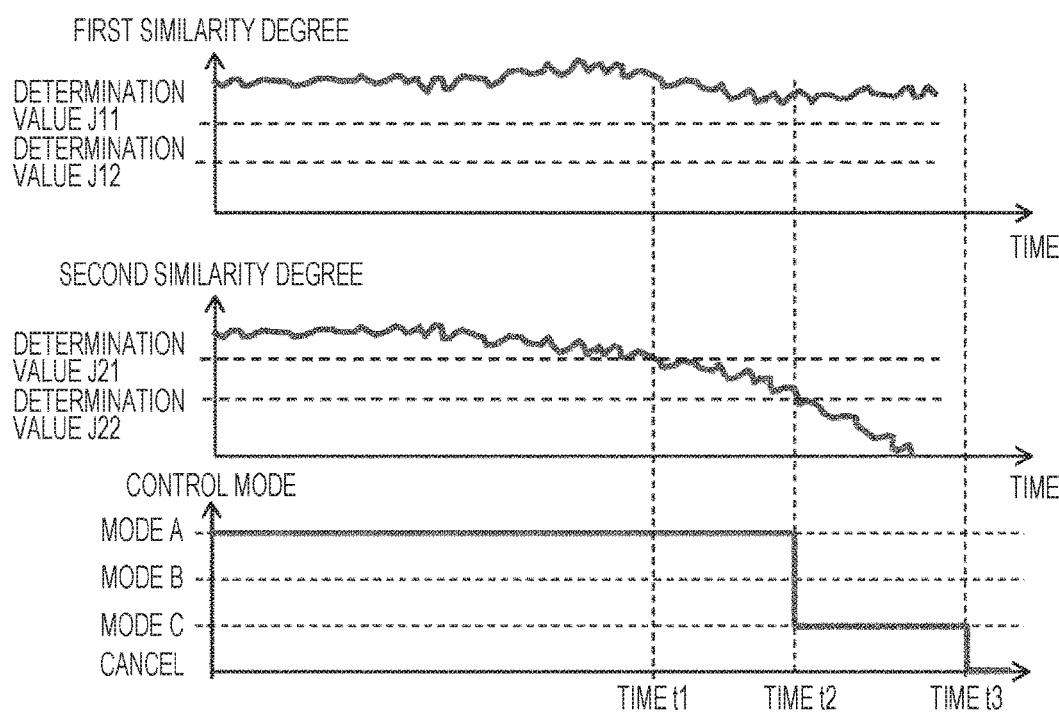
FIG. 20(B) FIG. 20B illustrates time changes of a first similarity degree, a second similarity degree, and a control mode executed by a drive control device 60 in a scene different from FIG. 20(A).

FIGS. 20(A) and 20(B) are diagrams illustrating an embodiment of changing drive control of the drive control device 60 according to a first similarity degree and a second similarity degree, in a drive control system according to the present invention. FIG. 20(A) illustrates time changes of the first similarity degree, the second similarity degree, and a control mode executed by the drive control device 60. In addition, FIG. 20(B) illustrates time changes of the first similarity degree, the second similarity degree, and the control mode executed by the drive control device 60 in a scene different from FIG. 20(A).

Similar to FIG. 19, determination values J11 and J12 and determination values J21 and J22 are set to the first similarity degree and the second similarity degree illustrated in FIGS. 20(A) and 20(B), respectively. In addition, the drive control device 60 has four modes of a mode A, a mode B, a mode C, and a cancel as control modes. Here, as examples of the modes A, B, C and the cancel, the mode A is a self-driving control mode in which control to detect a lane marker in front of the own vehicle 100 and maintain the vehicle at a center of a lane and control to detect a moving object or an obstacle in front of the own vehicle 100 and avoid a collision are fused, the mode B is a control mode in which the moving object or the obstacle in front of the own vehicle 100 is detected and the collision is avoided, the mode C is a control mode in which the lane marker in front of the own vehicle 100 is detected and the vehicle is maintained at the center of the lane, and the cancel cancels all self-driving or driving-assisting modes.

An example of FIG. 20(A) will be described. FIG. 20(A) is an example of the case where the own vehicle first drives in a self-driving control mode (control mode A) in which the control to detect the lane marker in front of the own vehicle 100 and maintain the vehicle at the center of the lane and the control to detect the moving object or the obstacle in front of the own vehicle 100 and avoid the collision are fused and a first similarity degree for road surface information decreases. As illustrated in FIG. 20(A), the first similarity degree decreases with time and is less than the determination value J11 at time t1. If the first similarity degree is less than the determination value J11 at the time t1, information showing that road surface detection performance is degraded is displayed to the driver. However, the control mode does not change and the mode A is maintained. In addition, if the first similarity degree for the road surface information further decreases and is less than the determination value J12 at time t2, it is determined that the road surface detection performance is degraded and it is difficult to maintain control based on road surface detection. As a result, it is determined that the control to detect the lane marker in front of the own vehicle 100 and maintain the vehicle at the center of the lane cannot be maintained and only the control to detect the moving object or the obstacle in front of the own vehicle 100 and avoid the collision can be maintained and the control mode changes from the mode A to the mode B. In the case in which the control mode changes from the mode A to the mode B due to the degradations of the detection performances of the image recognition devices 80-1 to 80-4, if predetermined time passes after the change, the control mode changes to the mode of the cancel in which all automatic controls are cancelled at time t3, because the mode changes due to the degradations of the detection performances of the image recognition devices 80-1 to 80-4.

Next, an example of FIG. 20(B) will be described. FIG. 20(B) is an example of the case where the own vehicle first drives in a self-driving control mode (mode A) in which the control to detect the lane marker in front of the own vehicle 100 and maintain the vehicle at the center of the lane and the control to detect the moving object or the obstacle in front of the own vehicle 100 and avoid the collision are fused and a second similarity degree for solid object information decreases. As illustrated in FIG. 20(B), the second similarity degree decreases with time and is less than the determination value J21 at time t1. If the second similarity degree is less than the determination value J21 at the time t1, information showing that solid object detection performance is degraded is displayed to the driver. However, the control mode does not change and the mode A is maintained. In addition, if the second similarity degree for the solid object information further decreases and is less than the determination value J22 at time t2, it is determined that the solid object detection performance is degraded and it is difficult to maintain control based on solid object detection. As a result, it is determined that the control to detect the moving object or the obstacle in front of the own vehicle 100 and avoid the collision cannot be maintained and only the control to detect the lane marker in front of the own vehicle 100 and maintain the vehicle at the center of the lane can be maintained and the control mode changes from the mode A to the mode C. In the case in which the control mode changes from the mode A to the mode C due to the degradations of the detection performances of the image recognition devices 80-1 to 80-4, if predetermined time passes after the change, the control mode changes to the mode of the cancel in which all automatic controls are cancelled at time t3, because the mode changes due to the degradations of the detection performances of the image recognition devices 80-1 to 80-4.

In this embodiment, the description has been given using the first similarity degree and the second similarity degree. However, even when an index of road surface detection performance operated from the first similarity degree or an index of solid object detection performance operated from the second similarity degree is used instead, the description is the same.

As such, determination and display of degradation of the detection performance are performed on the basis of the decrease of the similarity degree or the index of the detection performance and cancel of the drive control according to the degradation of the detection performance is performed after the determination and the display of the degradation of the detection performance are performed, so that control is not cancelled rapidly with respect to the driver. Therefore, the driver can previously correspond to the cancel of the control according to the degradation of the detection performance. In addition, when any one of the road surface detection performance and the solid object detection performance is degraded, control using the detection result of the first degraded performance is first cancelled and control using the other detection result is then cancelled, so that the entire control can be cancelled with spare time provided to the driver.

REFERENCE SIGNS LIST 10 engine
20 transmission
30 engine control device
40 brake control device
50 communication device
60 drive control device
61 performance determination unit
62 peripheral environment storage unit
63 vehicle control unit
64 operation amount operation unit
65 display device
66 alarm unit
67 image recognition storage device
68 self-position storage unit
80-1 image recognition device
80-2 image recognition device
80-3 image recognition device
80-4 image recognition device
90 braking device
100 vehicle, own vehicle
110 alarm device
120 display device
611 similarity degree operation unit
612 performance quantification unit
613 first similarity degree operation unit
614 second similarity degree operation unit
621 road surface feature amount storage unit
622 solid object feature amount storage unit

The invention claimed is:

1. A drive control system comprising cameras to detect a peripheral environment of a vehicle and a drive control device to control drive of the vehicle, comprising:
a computer-readable storage medium which stores the peripheral environment of the vehicle, wherein
the drive control device is configured to change a mode of drive control executed by the drive control device on the basis of statuses of detection performances of the cameras acquired on the basis of information of the peripheral environment stored in the computer-readable storage medium and detection information by the cameras,
the computer-readable storage medium stores a feature amount regarding a road surface of a road and a feature amount regarding a solid object around the road, which are acquired by the cameras during a past drive of the vehicle, and
when statuses of the detection performances of the cameras become degraded, a notice is issued to inform of an impending cancelation of the control drive of the vehicle, and then after a passage of time, the control drive of the vehicle is turned off.

2. The drive control system according to claim 1, wherein similarity degrees of comparison target objects stored in the computer-readable storage medium and target objects detected by the cameras are calculated and the mode of the drive control executed by the drive control device is changed on the basis of the similarity degrees.

3. The drive control system according to claim 1, wherein similarity degrees of target objects detected by the cameras at a plurality of different points where the vehicle drives and comparison target objects stored in the computer-readable storage medium and corresponding to the plurality of different points are calculated, the detection performances of the cameras are determined from the similarity degrees, and the mode of the drive control executed by the drive control device is changed on the basis of the detection performances.

4. The drive control system according to claim 1, wherein statuses of detection performances of the cameras are reported on the basis of information of the peripheral environment stored in the computer-readable storage medium and detection information by the cameras.

5. The drive control system according to claim 4, wherein similarity degrees of comparison target objects stored in the computer-readable storage medium and target objects detected by the cameras are calculated, the detection performances of the cameras are determined on the basis of the similarity degrees, and the statuses of the detection performances of the cameras are reported.

6. The drive control system according to claim 4, wherein similarity degrees of target objects detected by the cameras at a plurality of different points where the vehicle drives and comparison target objects stored in the computer-readable storage medium and corresponding to the plurality of different points are calculated, the detection performances of the cameras are determined from the similarity degrees, and the statuses of the detection performances of the cameras are reported.

7. The drive control system according to claim 1, wherein two similarity degrees of a first similarity degree and a second similarity degree, the first similarity degree showing a similarity degree of a feature amount regarding a road surface of a road around the vehicle, stored in the computer-readable storage medium, and a feature amount regarding the road surface of the road, detected by the cameras, the second similarity degree showing a similarity degree of a feature amount regarding a solid object, stored in the computer-readable storage medium, and a feature amount regarding the solid object around the road, detected by the cameras, are calculated and steering control is changed by the drive control device, according to the two similarity degrees.

8. The drive control system according to claim 1, wherein two similarity degrees of a first similarity degree and a second similarity degree, the first similarity degree showing a similarity degree of a feature amount regarding a road surface of a road around the vehicle, stored in the computer-readable storage medium, and a feature amount regarding the road surface of the road, detected by the cameras, the second similarity degree showing a similarity degree of a feature amount regarding a solid object, stored in the computer-readable storage medium, and a feature amount regarding the solid object around the road, detected by the cameras, are calculated and acceleration/deceleration control is changed by the drive control device, according to the two similarity degrees.

9. The drive control system according to claim 1, wherein two similarity degrees of a first similarity degree and a second similarity degree, the first similarity degree showing a similarity degree of a feature amount regarding a road surface of a road around the vehicle, stored in the computer-readable storage medium, and a feature amount regarding the road surface of the road, detected by the cameras, the second similarity degree showing a similarity degree of a feature amount regarding a solid object, stored in the computer-readable storage medium, and a feature amount regarding the solid object around the road, detected by the cameras, are output.

10. The drive control system according to claim 1, wherein
the computer-readable storage medium stores environment information around the own vehicle detected by the cameras of the own vehicle, in a road which the own vehicle has passed.

11. The drive control system according to claim 1, wherein
the computer-readable storage medium receives information of a peripheral environment detected by an external world recognition sensor installed around the road, using a communication device of the own vehicle, and stores the information.

12. The drive control system according to claim 1, wherein
the computer-readable storage medium receives information of a peripheral environment detected by a vehicle other than the own vehicle, using a communication device of the own vehicle, and stores the information.

13. The drive control system according to claim 10, wherein
the computer-readable storage medium acquires the environment information around the own vehicle detected by the cameras of the own vehicle in the road which the own vehicle has passed, the information of the peripheral environment detected by the external world recognition sensor installed around the road, or the information of the peripheral environment detected by the vehicle other than the own vehicle, receives the information from a data center storing the information using the communication device of the own vehicle, and stores the information.

* * * * *